(12) United States Patent
Abe et al.

(10) Patent No.: US 11,953,866 B2
(45) Date of Patent: Apr. 9, 2024

(54) PREDICTION CONTROL DEVELOPMENT DEVICE, PREDICTION CONTROL DEVELOPMENT METHOD, AND COMPUTER READABLE STORAGE MEDIUM

(71) Applicant: OMRON Corporation, Kyoto (JP)

(72) Inventors: Yasuaki Abe, Takatsuki (JP); Yuki Ueyama, Kyoto (JP); Takahiro Toku, Kusatsu (JP); Shuji Inamoto, Kyoto (JP)

(73) Assignee: OMRON Corporation, Kyoto (JP)

( * ) Notice: Subject to any disclaimer, the term of this patent is extended or adjusted under 35 U.S.C. 154(b) by 504 days.

(21) Appl. No.: 17/270,455

(22) PCT Filed: Feb. 25, 2020

(86) PCT No.: PCT/JP2020/007284
§ 371 (c)(1),
(2) Date: Feb. 23, 2021

(87) PCT Pub. No.: WO2020/175418
PCT Pub. Date: Sep. 3, 2020

(65) Prior Publication Data
US 2021/0325838 A1    Oct. 21, 2021

(30) Foreign Application Priority Data
Feb. 25, 2019   (JP) ................................. 2019-032027

(51) Int. Cl.
*G05B 13/04* (2006.01)
*G05B 19/05* (2006.01)
*G06N 5/04* (2023.01)

(52) U.S. Cl.
CPC .......... *G05B 13/048* (2013.01); *G05B 19/054* (2013.01); *G06N 5/04* (2013.01); *G05B 2219/1105* (2013.01)

(58) Field of Classification Search
CPC .... G05B 13/048; G05B 19/05; G05B 19/054; G05B 19/402; G05B 2219/1105;
(Continued)

(56) References Cited

U.S. PATENT DOCUMENTS

2003/0200879 A1\* 10/2003 Teraoka ............... B30B 15/0041
                                                         100/291
2003/0217337 A1\* 11/2003 Prewett .................. G05B 17/02
                                                         703/2
(Continued)

FOREIGN PATENT DOCUMENTS

JP    2016115289      6/2016
JP    2018116545      7/2018
JP    2019010750 A  \*  1/2019

OTHER PUBLICATIONS

"Search Report of Europe Counterpart Application", dated Dec. 6, 2022, pp. 1-8.
(Continued)

*Primary Examiner* — Yuhui R Pan
(74) *Attorney, Agent, or Firm* — JCIPRNET

(57) ABSTRACT

A prediction control development device according to one aspect of the present invention generates a prediction model of a control amount by analyzing first time-series data of the control amount and provides the generated prediction model to a controller. The prediction control development device acquires second time-series data showing transition of a value of the control amount during prediction control using the prediction model, and evaluates prediction accuracy of the prediction model based on a difference between a prediction value by the prediction model and a value of the
(Continued)

second time-series data. When the prediction accuracy of the prediction model is not allowable, the prediction control development device analyzes the second time-series data to newly generate a prediction model of the control amount, and provides the newly generated prediction model to the controller.

6 Claims, 12 Drawing Sheets

(58) Field of Classification Search
CPC ............ G06N 3/04; G06N 3/084; G06N 5/04; G16Y 10/25; G16Y 40/30
See application file for complete search history.

(56) References Cited

U.S. PATENT DOCUMENTS

2011/0276180 A1* 11/2011 Seem ................ G05B 13/0265
700/32
2014/0297002 A1 10/2014 Ji

OTHER PUBLICATIONS

"International Search Report (Form PCT/ISA/210) of PCT/JP2020/007284", dated Apr. 14, 2020, with English translation thereof, pp. 1-4.
"Written Opinion of the International Searching Authority (Form PCT/ISA/237) of PCT/JP2020/007284", dated Apr. 14, 2020, with English translation thereof, pp. 1-6.

* cited by examiner

PREDICTION CONTROL DEVELOPMENT DEVICE, PREDICTION CONTROL DEVELOPMENT METHOD, AND COMPUTER READABLE STORAGE MEDIUM

CROSS-REFERENCE TO RELATED APPLICATION

This application is a 371 application of the International PCT application serial no. PCT/JP2020/007284, filed on Feb. 25, 2020, which claims the priority benefits of Japan Patent Application No. 2019-032027, filed on Feb. 25, 2019. The entirety of each of the above-mentioned patent applications is hereby incorporated by reference herein and made a part of this specification.

TECHNICAL FIELD

The present invention relates to a prediction control development device, a prediction control development method, and a computer readable storage medium.

BACKGROUND ART

In order to control the operation of a control target device, a controller such as a programmable logic controller (PLC) is generally used. In the related art, the calculation capability of a controller is limited, and thus the controller is configured to control the operation of a control target device by a relatively simple control method such as proportional-integral-differential (PID) control and PI control. However, in recent years, an improvement in the calculation capability of a controller has made it possible to implement advanced control methods using a prediction model.

For example, in Patent Literature 1, a method of implementing a prediction model on a PLC used to control factory processes such as chemical plants and oil factories has been proposed. Specifically, it has been proposed that data indicating operation results of a system process is collected, a prediction model for predicting the state of the system is generated based on the obtained data, and the control of the system is optimized using the generated prediction model. According to this method, it is possible to optimize factory processes and reduce the probability of poor quality products being manufactured.

CITATION LIST

Patent Literature

[Patent Literature 1]
US Patent Application Publication No 2014/0297002

SUMMARY OF INVENTION

Technical Problem

The inventors of the present invention have found that the above-described prediction control in the related art using a prediction model that predicts the state of a control target device (that is, a control amount) has the following problems.

That is, in Patent Literature 1, a PLC is assumed to be used in a relatively large-scale production device such as a chemical plant or an oil factory. In such a large-scale production device, setup changes such as workpiece switching and adjustment rarely occur, and thus it is possible to collect data indicating control results under various situations in model development of a prediction control system. For this reason, it is possible to easily generate a prediction model making it possible to predict a control amount with high accuracy based on the collected data.

However, in a case where a relatively small-scale production device such as a conveyer or a pressing machine is used as a control target device, setup changes of the production device frequently occur, and thus it is difficult to secure sufficient time to collect data indicating control results under various situations. For this reason, data to be collected may deviate, and thus it is difficult to generate a prediction model making it possible to predict a control amount with high accuracy. Thereby, a prediction model with low prediction accuracy is generated, and thus when prediction control of a production device using the prediction model is performed, this results in a possibility of a higher probability of low quality products being generated. The inventors of the present invention have found that prediction control in the related art using a prediction model has such problems.

The present invention is contrived in view of such circumstances in one aspect, and an objective thereof is to provide a technique for generating a prediction model making it possible to predict a control amount with high accuracy when not only a large-scale production device but also a relatively small-scale production device is used as a control target device.

Solution to Problem

The present invention adopts the following configurations in order to solve the above-described problems.

That is, a prediction control development device according to an aspect of the present invention includes a first acquisition part which acquires first time-series data indicating change in a value of a control amount of a control target device while a controller is controlling the control target device by giving a plurality of instruction values to the control target device as time-series data of an operation amount, a model generation part which generates a prediction model of the control amount by analyzing the acquired first time-series data, a model providing part which provides the prediction model to the controller by causing the controller to correct the instruction values in accordance with a predicted value of the control amount predicted by the prediction model and giving the corrected instruction values to the control target device, a second acquisition part which acquires second time-series data indicating change in a value of the control amount of the control target device while the controller is controlling the control target device by giving the corrected instruction values to the control target device, and a model evaluation part which evaluates whether or not accuracy of prediction performed using the prediction model is acceptable based on a difference between the predicted value of the control amount predicted by the prediction model and the value of the control amount indicated by the second time-series data, in which in a case where it is evaluated that the accuracy of prediction performed using the prediction model is not acceptable, the model generation part generates a prediction model of the control amount again by analyzing the acquired second time-series data, and the model providing part updates a prediction model held in the controller by providing the prediction model generated again to the controller.

The prediction control development device according to the configuration generates a prediction model of a control amount by acquiring first time-series data indicating change in the value of a control amount and analyzing the acquired first time-series data. The generated prediction model is provided to a controller that controls the operation of a control target device. The controller executes prediction control of the control target device using the obtained prediction model. The prediction control development device according to the configuration acquires second time-series data indicating change in the value of a control amount of the control target device during the prediction control using the prediction model. Next, the prediction control development device according to the configuration evaluates whether or not the accuracy of prediction performed using the prediction model is acceptable based on a difference between a predicted value of a control amount predicted by the prediction model and the value of the control amount indicated by the second time-series data. Further, in a case where it is evaluated that the accuracy of prediction performed using the prediction model is not acceptable, the prediction control development device according to the configuration generates a prediction model of a control amount again by analyzing the second time-series data and updates a prediction model held in the controller by providing the prediction model generated again to the controller.

That is, according to the configuration, it is possible to verify the accuracy of prediction performed using the prediction model after the prediction model is provided to the controller. In addition, as a result of the verification, in a case where the accuracy of prediction performed using the prediction model is not acceptable, a new prediction model is generated on the basis of second time-series data newly obtained under an environment in which the prediction model is provided, and the prediction model used for prediction control can be updated using the newly generated prediction model. Thereby, a time for which the first time-series data is collected is relatively short, and thus it is possible to improve the accuracy of prediction performed using the prediction model by updating the prediction model using the second time-series data even when the accuracy of prediction of a control amount using the obtained prediction model is low. That is, it is possible to continuously improve the accuracy of prediction performed using the prediction model even while operating the prediction model. Thus, according to the prediction control development device based on the configuration, it is possible to generate a prediction model making it possible to predict a control amount with high accuracy even when not only a large-scale production device but also a relatively small-scale production device is used as a control target device.

Meanwhile, the control amount is an amount to be controlled such as a rotation angle or a rotation speed of a motor. The time-series data of the control amount may be obtained by a simulation or may be obtained by the driving of an actual machine. A sensor may be used for the acquisition of the time-series data. The sensor may be appropriately selected in accordance with a control amount to be measured. The first time-series data may be obtained during control that does not use a prediction model (that is, normal control). Alternatively, the first time-series data may be obtained during prediction control using the prediction model, similar to the second time-series data. In this case, the prediction model may be given in advance.

The operation amount is an amount given to the control target device, such as a voltage of a motor. The type of control target device may not be particularly limited and may be appropriately selected in accordance with an embodiment. The control target device may be a relatively small-scale production device used in a production line for, such as a pressing machine, a web conveyance device, an injection molding machine, an NC lathe, an electric discharge machine, and a packaging machine. The operation of the relatively small-scale production device may be controlled by, for example, a small-scale control device represented by a PLC. An instruction value given to the control target device as an operation amount may be determined by a known control method such as PID control or PI control. Correcting the instruction value in accordance with a predicted value of a control amount may include directly correcting the determined instruction value in accordance with the predicted value and indirectly correcting the determined instruction value by correcting a target value of a control amount in accordance with the predicted value.

The prediction model is configured to predict a predicted value of a control amount at a second time later than a first time from the value of a control amount (a measured value or a predicted value) at the first time. That is, the prediction model is configured to output the predicted value of the control amount at the second time when the value of the control amount at the first time is input. For the input of the prediction model, the value of one time may be used, or a plurality of values within a predetermined time section in the past may be used. In addition, for the input of the prediction model, data other than the value of the control amount may further be used. As the data other than the value of the control amount, for example, the value of an operation amount, individual information of a work piece, and the like may be input to the prediction model.

The type of such a prediction model may not be particularly limited, and may be appropriately selected in accordance with an embodiment. The prediction model may be constituted by a regression model such as a self-regression model, or may be constituted by a machine learning model such as a neural network. A method of analyzing time-series data in order to generate the prediction model may not be particularly limited and may be appropriately selected in accordance with the type of prediction model. In a case where the prediction model is constituted by a self-regression model, a known regression analysis method such as a least-squares method may be used as an analysis method. Further, in a case where the prediction model is constituted by a machine learning model such as a neural network, a known machine learning method such as an error backward propagation method may be used as an analysis method.

The prediction control development device according to the aspect may further include a correction amount designation part which designates an amount of correction for each of the instruction values in the controller. According to the configuration, when the verification and updating of the prediction model are repeated, the degree of prediction control performed using the prediction model can be adjusted. Thereby, it is possible to achieve optimization of prediction control using the prediction model.

In the prediction control development device according to the aspect, the correction amount designation part may perform designation so that the amount of correction increases whenever the prediction model is updated. According to the configuration, it is possible to optimize prediction control using the prediction model by gradually increasing a correction amount for each instruction value in the prediction control using the prediction model (that is, gradually increasing the degree of prediction control).

The prediction control development device according to the aspect may further include an output part which displays the predicted value of the control amount predicted by the prediction model and the value of the control amount indicated by the second time-series data on a display device. According to the configuration, it is possible to confirm the accuracy of prediction of a control amount using the generated prediction model.

In the prediction control development device according to the aspect, the control target device may be a pressing machine constituted by a mold, the operation amount may be a voltage of a servo motor driving the mold, and the control amount may be a position of the mold. According to the configuration, it is possible to generate a prediction model making it possible to predict the position of the mold with high accuracy and usable for prediction control of the pressing machine. Thereby, it is possible to optimize a factory process including the pressing machine and reduce the probability of poor quality products being manufactured.

In the prediction control development device according to the aspect, the control target device may be a web conveyance device configured to convey a web, the operation amount may be a voltage of an actuator for adjusting a position of an end of the web, and the control amount may be a position of an end of the web. According to the configuration, it is possible to generate a prediction model making it possible to predict the position of the end of the web with high accuracy and usable for prediction control of the web conveyance device. Thereby, it is possible to optimize a factory process including the web conveyance device and reduce the probability of poor quality products being manufactured.

As another aspect of the prediction control development device according to the above-described aspects, an aspect of the present invention may be an information processing method realizing the above-described configurations, may be a program, or a storage medium readable by a computer or the like and storing the program. Here, the storage medium readable by a computer or the like is a medium in which information such as a program is stored by an electrical, magnetic, optical, mechanical, or chemical action.

For example, a prediction control development method according to an aspect of the present invention includes causing a computer to execute a step of acquiring first time-series data indicating change in a value of a control amount of a control target device while a controller is controlling the control target device by giving a plurality of instruction values to the control target device as time-series data of an operation amount, a step of generating a prediction model of the control amount by analyzing the acquired first time-series data, a step of providing the prediction model to the controller by causing the controller to correct the instruction values in accordance with a predicted value of the control amount predicted by the prediction model and giving the corrected instruction values to the control target device, a step of acquiring second time-series data indicating change in a value of the control amount of the control target device while the controller is controlling the control target device by giving the corrected instruction values to the control target device, and a step of evaluating whether or not accuracy of prediction performed using the prediction model is acceptable based on a difference between the predicted value of the control amount predicted by the prediction model and the value of the control amount indicated by the second time-series data, in which in a case where it is evaluated that the accuracy of prediction performed using the prediction model is not acceptable, the computer generates a prediction model of the control amount again by analyzing the acquired second time-series data, and updates a prediction model held in the controller by providing the prediction model generated again to the controller.

In addition, for example, a computer readable storage medium storing a prediction control development program according to an aspect of the present invention causes a computer to execute a step of acquiring first time-series data indicating change in a value of a control amount of a control target device while a controller is controlling the control target device by giving a plurality of instruction values to the control target device as time-series data of an operation amount, a step of generating a prediction model of the control amount by analyzing the acquired first time-series data, a step of providing the prediction model to the controller by causing the controller to correct the instruction values in accordance with a predicted value of the control amount predicted by the prediction model and giving the corrected instruction values to the control target device, a step of acquiring second time-series data indicating change in a value of the control amount of the control target device while the controller is controlling the control target device by giving the corrected instruction values to the control target device, and a step of evaluating whether or not accuracy of prediction performed using the prediction model is acceptable based on a difference between the predicted value of the control amount predicted by the prediction model and the value of the control amount indicated by the second time-series data, in which in a case where it is evaluated that the accuracy of prediction performed using the prediction model is not acceptable, the computer is caused to generate a prediction model of the control amount again by analyzing the acquired second time-series data and to update a prediction model held in the controller by providing the prediction model generated again to the controller.

Advantageous Effects of Invention

According to the present invention, it is possible to generate a prediction model making it possible to predict a control amount with high accuracy even when a relatively small-scale production device is used as a control target device.

DESCRIPTION OF EMBODIMENTS

Hereinafter, an embodiment according to an aspect of the present invention (hereinafter, also referred to as "the present embodiment") will be described on the basis of the drawings. However, the present embodiment to be described below is merely an example of the present invention in all respects. It is needless to say that various improvements and modifications can be made without departing from the scope of the present invention. That is, a specific configuration according to an embodiment may be appropriately adopted in implementing the present invention. Meanwhile, data appearing in the present embodiment is described in natural language, but more specifically, data may be designated in a pseudo language, commands, parameters, machine language, or the like which can be recognized by a computer.

§ 1 Application Example

Figure 1:
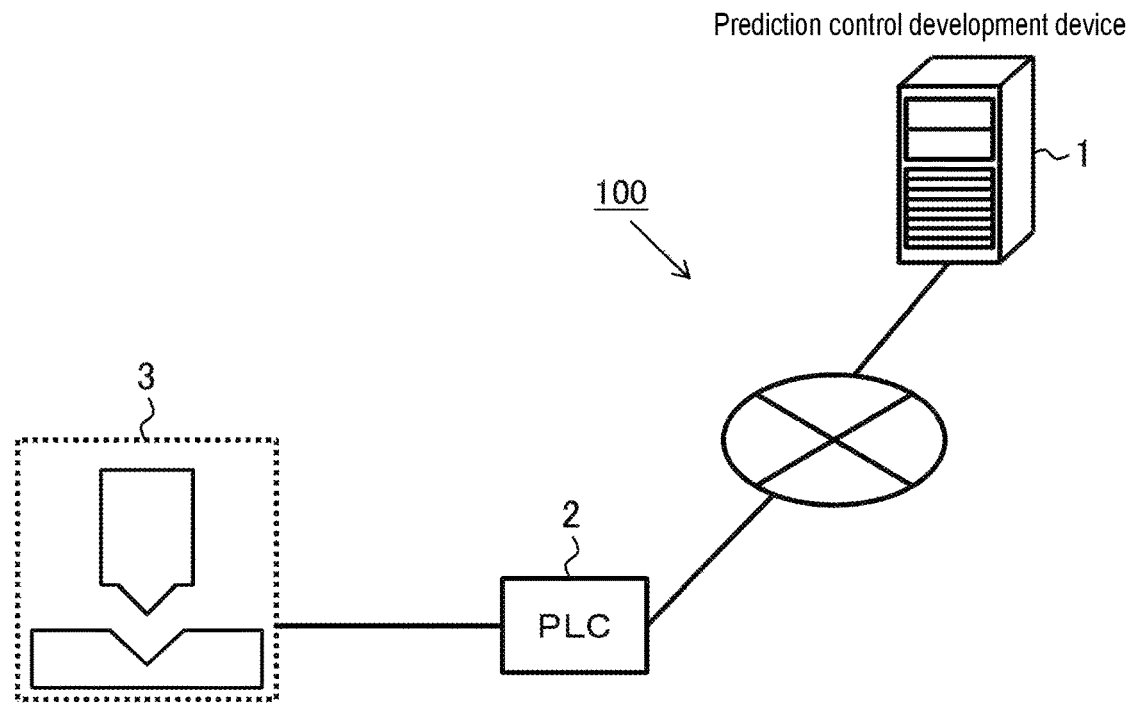
FIG. 1 schematically illustrates an example of a situation to which the present invention is applied.

First, an example of a situation to which the present invention is applied will be described using FIG. 1. FIG. 1 schematically illustrates an example of a situation to which a prediction control system 100 according to the present embodiment is applied.

As illustrated in FIG. 1, the prediction control system 100 according to the present embodiment includes a prediction control development device 1 and a PLC 2 which are connected to each other through a network. Thereby, the prediction control system 100 is configured to generate a prediction model for predicting a control amount of a control target device and perform prediction control of the operation of the control target device using the generated prediction model. The type of network between the prediction control development device 1 and the PLC 2 may be appropriately selected from, for example, the Internet, a wireless communication network, a mobile communication network, a telephone network, a dedicated network, and the like.

The PLC 2 is a computer configured to control the operation of a control target device. The PLC 2 is an example of a controller. In the present embodiment, a pressing machine 3 is connected to the PLC 2. The pressing machine 3 is an example of a control target device. However, each of the controller and the control target device is not limited to such an example, and may be appropriately selected in accordance with an embodiment.

Further, in the example of FIG. 1, the prediction control development device 1 and the PLC 2 are computers different from each other. However, the configuration of the prediction control system 100 is not limited to such an example. The prediction control development device 1 and the PLC 2 may be configured as an integrated computer. In addition, each of the prediction control development device 1 and the PLC 2 may be constituted by a plurality of computers.

The prediction control development device 1 according to the present embodiment is a computer configured to generate a prediction model which is usable for prediction control of a control target device. Specifically, the prediction control development device 1 according to the present embodiment acquires first time-series data indicating change in the value of a control amount of the control target device while a controller is controlling the control target device by giving a plurality of instruction values to the control target device as time-series data of an operation amount. The prediction control development device 1 generates a prediction model of a control amount by analyzing the acquired first time-series data. The control amount is an amount to be controlled. The operation amount is an amount to be given to the control target device. Each of the control amount and the operation amount may be appropriately selected in accordance with a control target device.

Next, the prediction control development device 1 according to the present embodiment provides the prediction model to the controller to control the operation of the control target device by causing the controller to correct instruction values in accordance with a predicted value of a control amount predicted by the prediction model and giving the corrected instruction values to the control target device. Thereby, the PLC 2 acquires the prediction model generated by the prediction control development device 1. The PLC 2 may be configured to be able to switch between two modes, that is, a prediction control mode for controlling the operation of a control target device using a prediction model and a normal control mode for determining an instruction value from a measured value of a control amount by a known control method such as PID control without using a prediction model.

Subsequently, the prediction control development device 1 according to the present embodiment acquires second time-series data indicating change in the value of a control amount of the control target device while the controller is controlling the control target device by giving the corrected instruction value to the control target device. Then, the prediction control development device 1 evaluates whether or not the accuracy of prediction performed using the prediction model is acceptable based on a difference between a predicted value of a control amount predicted by the prediction model and die value of a control amount indicated by the second time-series data.

In a case where it is evaluated that the accuracy of prediction performed using the prediction model is not acceptable, the prediction control development device 1 according to the present embodiment generates a prediction model of a control amount again by analyzing the acquired second time-series data. Then, the prediction control development device 1 updates a prediction model held by the controller by providing the prediction model generated again to the controller. That is, in a case where the accuracy of prediction performed using the prediction model is relatively low, the prediction control development device 1 according to the present embodiment generates a new prediction model on the basis of the second time-series data and updates the prediction model held by the PLC 2 using the generated prediction model.

As described above, in the prediction control system 100 according to the present embodiment, the accuracy of prediction performed using the prediction model generated by the prediction control development device 1 can be verified after the prediction model is provided to the PLC 2. In addition, as a result of the verification, in a case where the accuracy of prediction performed using the prediction model is not acceptable, it is possible to generate a new prediction model based on the second time-series data which is newly obtained under the environment in which the prediction model has been provided, and to update the prediction model to be used for prediction control by using the generated new prediction model. Thereby, even when the accuracy of prediction of a control amount using the obtained prediction model is low due to a relatively short period of time for collecting the first time-series data, it is possible to improve the accuracy of prediction performed using the prediction model by updating the prediction model using the second time-series data. That is, it is possible to continuously improve the accuracy of prediction performed using the prediction model even while operating the prediction model. Thus, according to the present embodiment, it is possible to generate a prediction model making it possible to predict a control amount with high accuracy when not only a large-scale production device but also a relatively small-scale production device such as the pressing machine 3 is used as a control target device.

§ 2 Configuration Example

[Hardware Configuration]
<Prediction Control Development Device>

Figure 2:
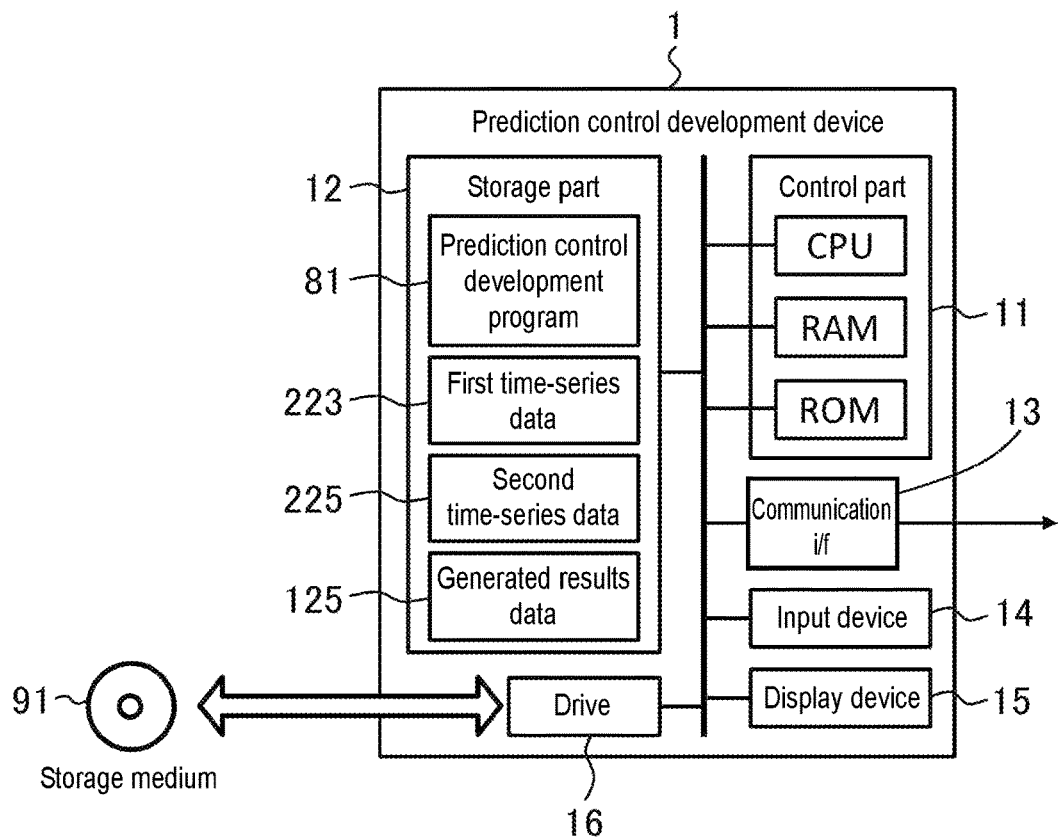
FIG. 2 schematically illustrates an example of a hardware configuration of a prediction control development device according to an embodiment.

Next, an example of a hardware configuration of the prediction control development device 1 according to the present embodiment will be described using FIG. 2. FIG. 2 schematically illustrates an example of a hardware configuration of the prediction control development device 1 according to the present embodiment.

As illustrated in FIG. 2, the prediction control development device 1 according to the present embodiment is a computer in which a control part 11, a storage part 12, a communication interface 13, an input device 14, a display device 15, and a drive 16 are electrically connected to each other. Meanwhile, in FIG. 2, the communication interface is referred to as a "communication I/F".

The control part 11 includes a central processing unit (CPU), a random access memory (RAM), a read only memory (ROM), and the like which are hardware processors, and is configured to execute information processing based on a program and various data. The storage part 12 is an example of a memory and is constituted by, for example, a hard disk drive, a solid state drive, or the like. In the present embodiment, the storage part 12 stores various information such as a prediction control development program 81, first time-series data 223, second time-series data 225, and generated results data 125.

The prediction control development program 81 is a program for causing the prediction control development device 1 to execute information processing (FIG. 9), which will be described later, regarding on the generation of a prediction model. The prediction control development program 81 includes a series of command groups of the information processing. The first time-series data 223 is an example of the above-described first time-series data, and the second time-series data 225 is an example of the above-described second time-series data. The generated results data 125 indicates information on a generated prediction model. The generated results data 125 is obtained as a result of executing the prediction control development program 81. Details will be given later.

The communication interface 13 is, for example, a wired local area network (LAN) module, a wireless LAN module, or the like, and is an interface for performing wired or wireless communication through a network. The prediction control development device 1 can perform data communication with other information processing devices (for example, the PLC 2) through a network by using the communication interface 13. In addition, the prediction control development device 1 can distribute the generated generated results data 125 to an external device by using the communication interface 13.

The input device 14 is a device for performing an input such as a mouse or a keyboard. In addition, the display device 15 is an example of an output device and is, for example, a display. An operator can operate the prediction control development device 1 through the input device 14 and the display device 15. Meanwhile, the display device 15 may be a touch panel display. In this case, the input device 14 may be omitted.

The drive 16 is, for example, a CD drive, a DVD drive, or the like, and is a drive device for reading a program stored in the storage medium 91. The type of drive 16 may be appropriately selected in accordance with the type of storage medium 91. At least any one of the above-described prediction control development program 81, the first time-series data 223, and the second time-series data 225 may be stored in the storage medium 91.

The storage medium 91 is a medium in which a computer, other devices, a machine, or the like accumulates information such as a program by an electrical, magnetic, optical, mechanical, or chemical action to be able to read the information such as the program. The prediction control development device 1 may acquire at least any one of the above-described prediction control development program 81, the first time-series data 223, and the second time-series data 225 from the storage medium 91.

Here, in FIG. 2, a disc-type storage medium such as a CD or a DVD is illustrated as an example of the storage medium 91. However, the type of storage medium 91 is not limited to a disc type and may be other than a disc type. The storage medium other than a disc-type storage medium may be a semiconductor memory such as a flash memory.

Meanwhile, with respect to a specific hardware configuration of the prediction control development device 1, omission, replacement, and addition of components can be appropriately performed in accordance with an embodiment. For example, the control part 11 may include a plurality of hardware processors. The hardware processor may be constituted by a microprocessor, a field-programmable gate array (FPGA), or the like. The storage part 12 may be constituted by the RAM and the ROM included in the control part 11. At least any one of the communication interface 13, the input device 14, the display device 15, and the drive 16 may be omitted. The prediction control development device 1 may be constituted by a plurality of information processing devices. In this case, hardware configurations of the respective computers may or may not match each other. In addition, a general-purpose server device, a general-purpose personal computer (PC), or the like may be used for the prediction control development device 1, in addition to an information processing device designed exclusively for a service to be provided.

<PLC>

Figure 3:
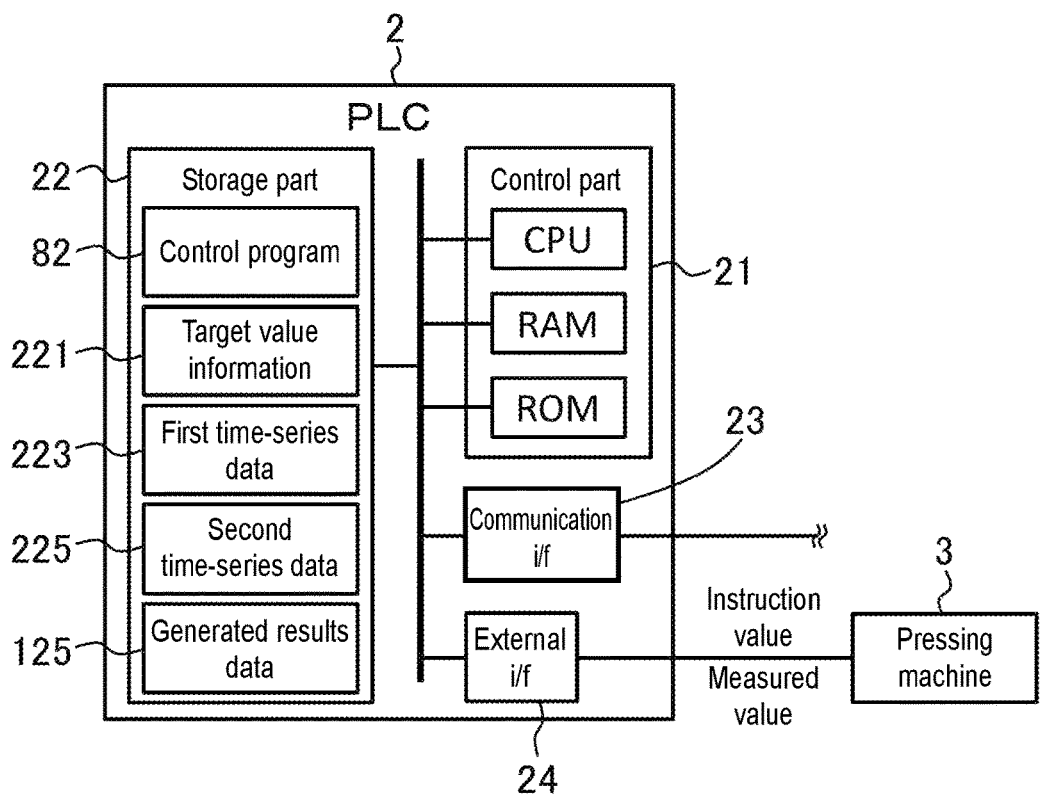
FIG. 3 schematically illustrates an example of a hardware configuration of a PLC (controller) according to the embodiment.

Next, an example of a hardware configuration of the PLC 2 according to the present embodiment will be described using FIG. 3. FIG. 3 schematically illustrates an example of a hardware configuration of the PLC 2 according to the present embodiment.

As illustrated in FIG. 3, the PLC 2 is a computer in which a control part 21, a storage part 22, a communication interface 23, and an external interface 24 are electrically connected to each other. Thereby, the PLC 2 is configured to control the operation of a control target device such as the pressing machine 3. Meanwhile, in FIG. 3, a communication interface and an external interface are referred to as a "communication I/F" and an "external I/F", respectively.

The control part 21 includes a CPU, a RAM, a ROM, and the like, and is configured to execute information processing based on a program and various data. The storage part 22 is constituted by, for example, a RAM, a ROM, or the like, and stores various information such as a control program 82, target value information 221, first time-series data 223, second time-series data 225, and generated results data 125. The control program 82 is a program for causing the PLC 2 to execute information processing (FIG. 8), which will be described later, for controlling the operation of a control target device. The control program 82 includes a series of command groups of the information processing. The target value information 221 indicates a series of basic target values of a control amount at the time of causing a control target device to execute a predetermined operation. Details will be described later.

The communication interface 23 is, for example, a wired LAN module, a wireless LAN module, or the like, and is an interface for performing wired or wireless communication. The PLC 2 can perform data communication with another information processing device (for example, the prediction control development device 1) through a network by using the communication interface 23.

The external interface 24 is, for example, a universal serial bus (USB) port, a dedicated port, or the like, and is an interface for connection to an external device. The type and number of external interfaces 24 may be appropriately selected in accordance with the type and number of external devices connected thereto. In the present embodiment, the PLC 2 is connected to the pressing machine 3 through the external interface 24. Thereby, the PLC 2 can control the operation of the pressing machine 3 by transmitting an instruction value to the pressing machine 3. In addition, the PLC 2 can acquire a measured value of a control amount from the pressing machine 3.

Meanwhile, with respect to a specific hardware configuration of the PLC 2, omission, replacement, and addition of components can be appropriately performed in accordance with an embodiment. For example, the control part 21 may include a plurality of processors. The storage part 22 may be constituted by the RAM and the ROM included in the control part 21. The storage part 22 may be constituted by an auxiliary storage device such as a hard disk drive or a solid state drive. In addition, the PLC 2 may be replaced with a general-purpose information processing device such as a desktop PC or a tablet PC depending on a target to be controlled, in addition to an information processing device designed exclusively for a service to be provided.

<Pressing Machine>

Figure 4:
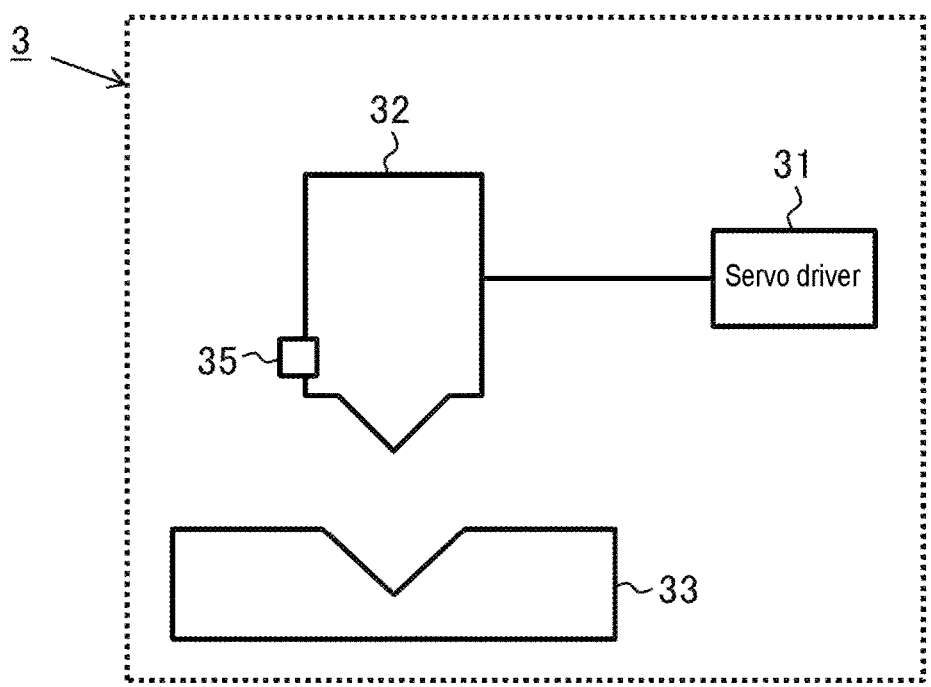
FIG. 4 schematically illustrates an example of a pressing machine (control target device) according to the embodiment.

Next, an example of a hardware configuration of the pressing machine 3 will be described using FIG. 4. FIG. 4 schematically illustrates an example of a hardware configuration of the pressing machine 3 according to the present embodiment.

The pressing machine 3 according to the present embodiment includes a servo driver 31, an upper mold 32, a lower mold 33, and a position sensor 35. The lower mold 33 is fixed, while the upper mold 32 is configured to be movable in a vertical direction by a servo motor (not shown). The position sensor 35 is configured to measure the position of the upper mold 32 with respect to the lower mold 33. Thereby, the upper mold 32 can press a work piece against the lower mold 33 to perform forming of the work piece or can be separated from the lower mold 33 by the position being controlled. The servo driver 31 is configured to drive the servo motor of the upper mold 32 based on an instruction value received from the PLC 2. In the present embodiment, a voltage of the servo motor driving the upper mold 32 is an example of an operation amount, and the position of the upper mold 32 is an example of a control amount.

However, the configuration of the pressing machine 3 is not limited to such an example. With respect to the configuration of the pressing machine 3, omission, replacement, and addition of components can be appropriately performed in accordance with an embodiment. For example, both the upper mold 32 and the lower mold 33 may be configured to be movable. In addition, the disposition of the position sensor 35 is not limited to the example of FIG. 4, and may be appropriately selected in accordance with an embodiment. The type of position sensor 35 may not be particularly limited as long as a distance between the upper mold 32 and the lower mold 33 can be measured, and may be appropriately selected in accordance with an embodiment. A known sensor may be used as the position sensor 35.

Figure 5A:
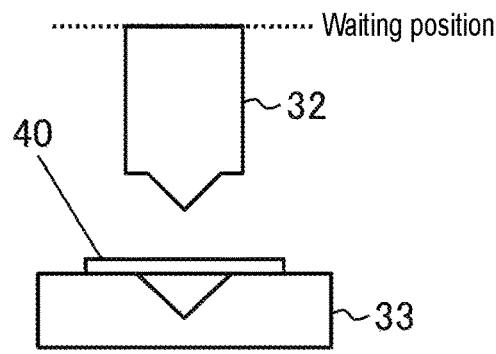
FIG. 5A schematically illustrates an example of a production process in a pressing machine of FIG. 4.

Next, an example of a production process in the pressing machine 3 is schematically illustrated using FIGS. 5A to 5D. The pressing machine 3 may be appropriately disposed in a production line. As illustrated in FIG. 5A, in an initial state, the upper mold 32 is disposed at a waiting position separated from the lower mold 33 and waits until a work piece 40 is conveyed to the lower mold 33. The work piece 40 is, for example, a plate material formed of a metal. However, the type of work piece 40 is not limited to such an example, and may be appropriately selected in accordance with an embodiment. The work piece 40 may be, for example, a raw material of a product, a product before processing, a part before assembly, or the like.

Figure 5B:
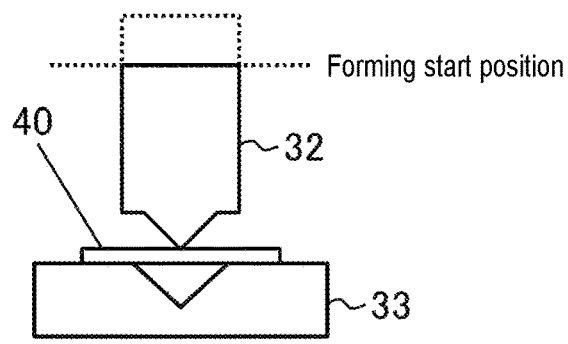
FIG. 5B schematically illustrates an example of a production process in the pressing machine of FIG. 4.

After the work piece 40 is disposed at a predetermined position of the lower mold 33, the pressing machine 3 drives the servo motor of the upper mold 32 by the servo driver 31 and disposes the upper mold 32 at a forming start position as illustrated in FIG. 5B. The forming start position is, for example, a position at which a tip end of the upper mold 32 comes into contact with the work piece 40 or a position immediately before the contact.

Figure 5C:
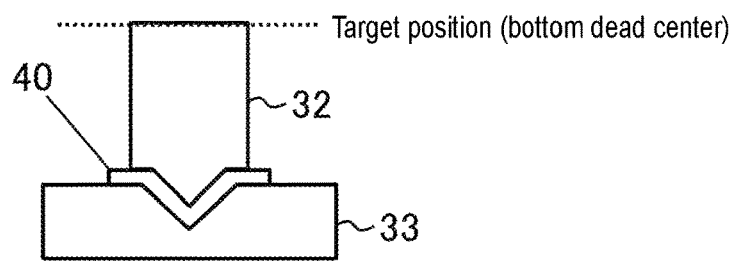
FIG. 5C schematically illustrates an example of a production process in the pressing machine of FIG. 4.

Then, as illustrated in FIG. 5C, the pressing machine 3 further drives the servo motor of the upper mold 32 by the servo driver 31, moves the upper mold 32 to a target position (bottom dead center), and performs forming of the work piece 40 by the upper mold 32 and the lower mold 33. Thereby, the pressing machine 3 can produce a product 41 from the work piece 40. Meanwhile, the product 41 may not be particularly limited as long as the product 41 is obtained by the pressing machine 3 performing production processing on the work piece 40, and may be a final product, or may be an intermediate product (a product in the middle of processing).

Figure 5D:
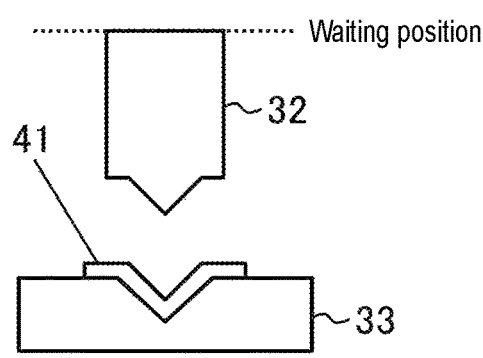
FIG. 5D schematically illustrates an example of a production process in the pressing machine of FIG. 4.

After the forming is completed, the pressing machine 3 drives the servo motor of the upper mold 32 by the servo driver 31 and moves the upper mold 32 to a waiting position as illustrated in FIG. 5D. Then, the product 41 obtained by forming the work piece 40 is conveyed from the pressing machine 3 by a belt conveyor (not shown) or the like. Thereby, a series of operations of a production process for producing the product 41 from the work piece 40 is completed. The PLC 2 controls the operation of the pressing machine 3 by determining an instruction value from a measured value and a target value of the position of the upper mold 32 obtained by the position sensor 35 to cause the pressing machine 3 to execute the series of production processes and giving the determined instruction value to the servo driver 31.

[Software Configuration]

<Prediction Control Development Device>

Figure 6:
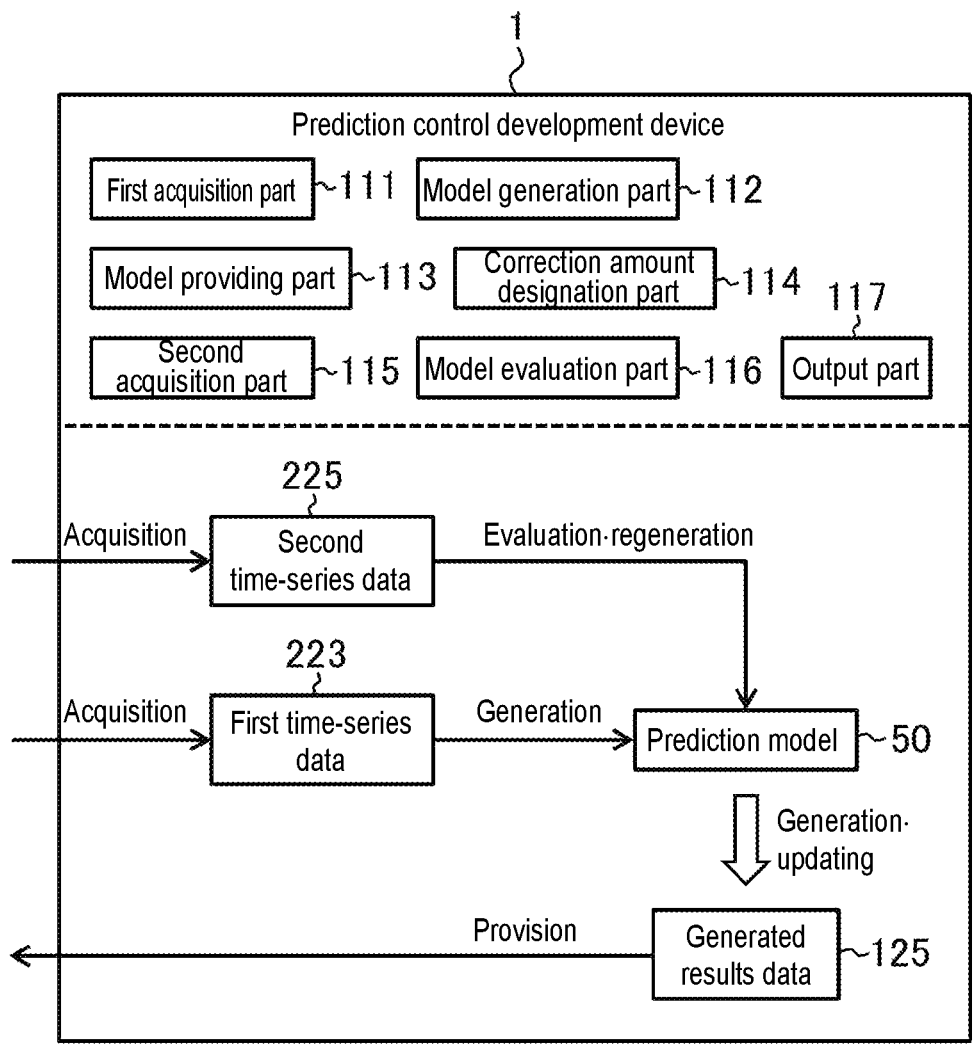
FIG. 6 schematically illustrates an example of a software configuration of a prediction control development device according to the embodiment.

Next, an example of a software configuration of the prediction control development device 1 according to the present embodiment will be described using FIG. 6. FIG. 6 schematically illustrates an example of a software configuration of the prediction control development device 1 according to the present embodiment.

The control part 11 of the prediction control development device 1 develops the prediction control development program 81 stored in the storage part 12 into the RAM. Then, the control part 11 analyzes and executes the prediction control development program 81 developed into the RAM by the CPU to control components based on a series of command groups included in the prediction control development program 81. Thereby, as illustrated in FIG. 6, the prediction control development device 1 according to the present embodiment operates as a computer including a first acquisition part 111, a model generation part 112, a model providing part 113, a correction amount designation part 114, a second acquisition part 115, a model evaluation part 116, and an output part 117 as software modules. That is, in the present embodiment, the software modules are realized by the control part 11 (CPU).

The first acquisition part 111 acquires the first time-series data 223 indicating change in the value of a control amount of a control target device while the controller is controlling the control target device by giving a plurality of instruction values to the control target device as time-series data of an operation amount. The model generation part 112 generates a prediction model 50 of a control amount by analyzing the acquired first time-series data 223, and generates generated results data 125 indicating the generated prediction model 50. In the present embodiment, the controller is the PLC 2, and the control target device is the pressing machine 3.

The model providing part 113 distributes the generated results data 125 to the controller to provide the generated prediction model 50 to the controller. Thereby, die model providing part 113 causes the controller to correct instruction values in accordance with a predicted value of a control amount predicted by the prediction model 50 and control the operation of a control target device by giving the corrected instruction values to the control target device. The correction amount designation part 114 designates the amount of correction for each instruction value in the controller.

The second acquisition part 115 acquires the second time-series data 225 indicating change in the value of a control amount of a control target device while the controller is controlling the control target device by giving the corrected instruction values to the control target device. The model evaluation part 116 evaluates whether or not the accuracy of prediction performed using the prediction model 50 is acceptable, based on a difference between a predicted value of a control amount predicted by the prediction model 50 and the value of a control amount indicated by the second time-series data 225. The output part 117 displays the predicted value of the control amount predicted by the prediction model 50 and the value of the control amount indicated by the second time-series data 225 on the display device 15.

In a case where it is evaluated that the accuracy of prediction performed using the prediction model 50 is not acceptable, the model generation part 112 generates the prediction model 50 of a control amount again by analyzing the acquired second time-series data 225. Thereby, the model generation part 112 updates the generated results data 125. The model providing part 113 distributes the updated generated results data 125 to the controller to provide the prediction model 50 generated again to the controller. Thereby, the model providing part 113 updates the prediction model 50 held in the controller.

The prediction model 50 is configured to predict a predicted value of a control amount at a second time later than a first time from the value of a control amount (a measured value or a predicted value) at the first time. That is, the prediction model 50 is configured to output the predicted value of the control amount at the second time in response to an input of the value of the control amount at the first time. For the input of the prediction model 50, the value of one time may be used, or a plurality of values within a predetermined time section in the past may be used. In addition, for the input of the prediction model 50, data other than the value of the control amount may further be used. As the data other than the value of the control amount, for example, the value of an operation amount, individual information of the work piece 40, and the like may be input to the prediction model 50.

The prediction model 50 is configured to include an operation parameter for calculating a predicted value from an input value of a control amount. The type of such a prediction model 50 may not be particularly limited, and may be appropriately selected in accordance with an embodiment. The prediction model 50 may be constituted by a regression model such as a self-regression model, or may be constituted by a machine learning model such as a neural network. The self-regression model is expressed by a regression expression summing up one or a plurality of terms including a self-regression coefficient. In a case where the prediction model 50 is constituted by the self-regression model, an example of an operation parameter is a self-regression coefficient in each term of the self-regression model, or the like. In addition, the neural network includes one or a plurality of layers including one or a plurality of neurons (nodes). In a case where the neural network includes a plurality of layers, each layer is typically disposed from an input side to an output side, and neurons included in adjacent layers are appropriately coupled to each other. A weight (coupling load) is set for each coupling. A threshold value is set for each neuron, and basically, the output of each neuron is determined according to whether or not the sum of products of each input and each weight exceeds the threshold value. In a case where the prediction model 50 is constituted by the neural network, an example of an operation parameter is, for example, a weight of coupling between neurons, a threshold value of each neuron, or the like.

A method of analyzing time-series data in order to generate the prediction model 50 may not be particularly limited and may be appropriately selected in accordance with the type of prediction model 50. In a case where the prediction model 50 is constituted by a self-regression model, the model generation part 112 may generate the prediction model 50 by deriving an operation parameter such as a self-regression coefficient in each term by a known regression analysis method such as a least-squares method. Further, in a case where the prediction model 50 is constituted by a machine learning model such as a neural network, the model generation part 112 may generate the prediction model 50 by deriving an operation parameter such as a weight of coupling between neurons or a threshold value of each neuron by a known machine learning method such as an error backward propagation method.

<PLC>

Figure 7:
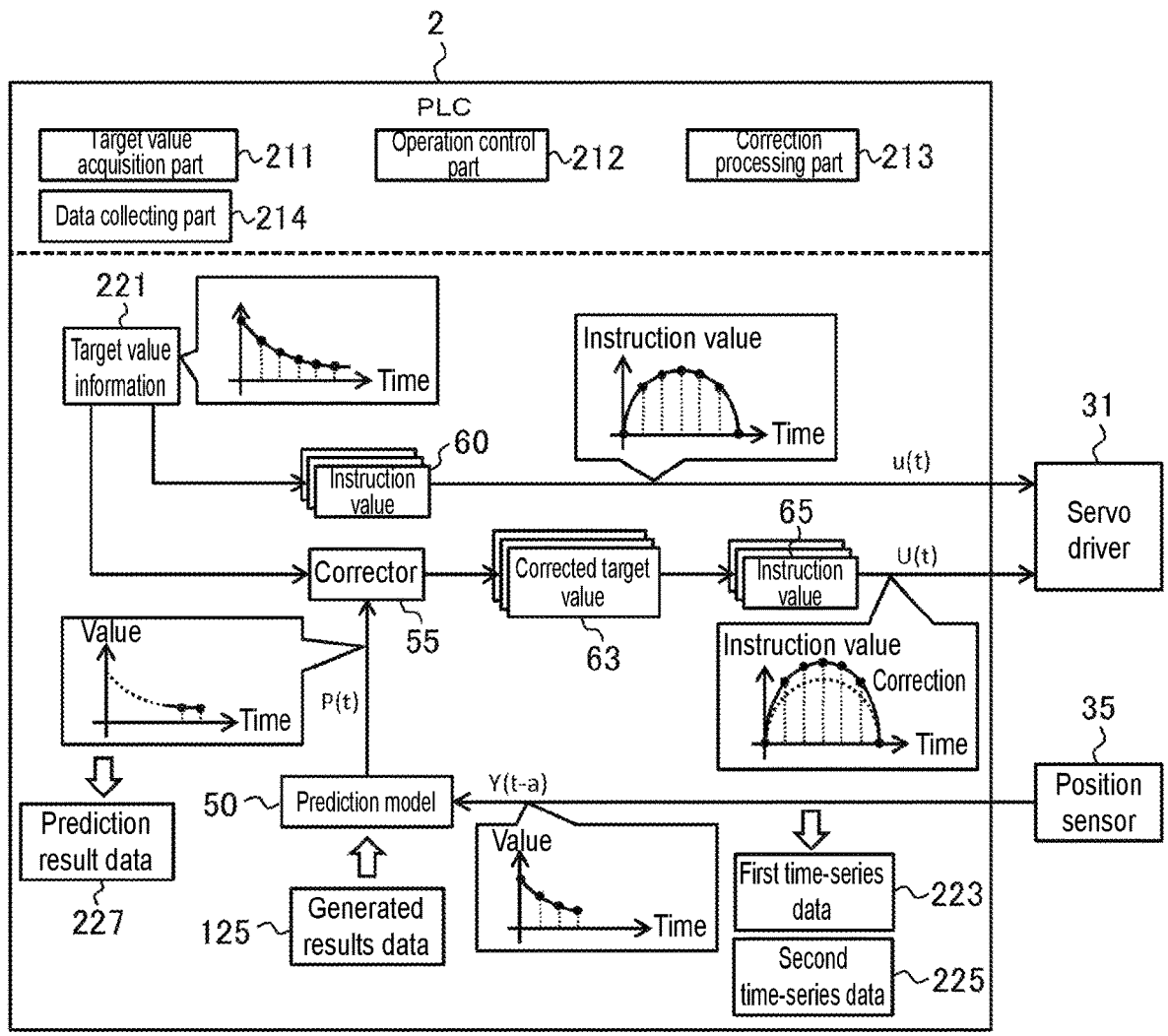
FIG. 7 schematically illustrates an example of a software configuration of the PLC (controller) according to the embodiment.

Next, an example of a software configuration of the PLC 2 according to the present embodiment will be described using FIG. 7. FIG. 7 schematically illustrates an example of a software configuration of the PLC 2 according to the present embodiment.

The control part 21 of the PLC 2 develops the control program 82 stored in the storage part 22 into the RAM. Then, the control part 21 analyzes and executes the control program 82 developed into the RAM by the CPU to control components based on a series of command groups included in the control program 82. Thereby, as illustrated in FIG. 7, the PLC 2 according to the present embodiment operates as a computer including a target value acquisition part 211, an operation control part 212, a correction processing part 213, and a data collecting part 214 as software modules. That is, in the present embodiment, the software modules are realized by the control part 21 (CPU).

The target value acquisition part 211 acquires a basic target value which is a target of a control amount of a control target device at the time of causing the control target device to execute a predetermined operation such as the operation in the above-described production process. In the present embodiment, a series of basic target values in a predetermined operation are given by the target value information 221. The target value acquisition part 211 acquires a basic target value of a control amount with reference to the target value information 221.

The operation control part 212 acquires a measured value of a control amount of a control target device. Then, the operation control part 212 controls the operation of the control target device by determining an instruction value based on the measured value of the control amount and an instruction target value and giving the determined instruction value to the control target device. In the example of the present embodiment, the control amount is the position of the upper mold 32, and the operation amount is a voltage of the servo motor driving the upper mold 32. The operation control part 212 acquires a measured value of the position of the upper mold 32 measured by the position sensor 35, and determines an instruction value based on the acquired measured value and instruction target value. Then, the operation control part 212 controls the position of the upper mold 32 in the pressing machine 3 by giving the determined instruction value to the servo driver 31 as an operation amount.

In a case where prediction control is not performed, the operation control part 212 determines an instruction value 60 from a basic target value and a measured value by using the basic target value as an instruction target value. On the other hand, in a case where prediction control is performed, the correction processing part 213 corrects the instruction value 60 using the prediction model 50. In the present embodiment, the correction processing part 213 includes the prediction model 50 by holding the generated results data 125. In addition, the correction processing part 213 includes a corrector 55 configured to correct a basic target value in accordance with a predicted value of a control amount. The corrector 55 may be constituted by an operation module expressed by a calculation expression or the like.

The correction processing part 213 sets the prediction model 50 generated by the prediction control development device 1 with reference to the generated results data 125. The correction processing part 213 calculates a predicted value from a measured value of a control amount by using the set prediction model 50. Next, the correction processing part 213 acquires a corrected target value 63 by correcting the basic target value in accordance with the predicted value predicted by the prediction model 50 using the corrector 55. The operation control part 212 determines an instruction value 65 from the corrected target value 63 and the measured value using the corrected target value 63 as an instruction target value. That is, in the present embodiment, the correction processing part 213 indirectly corrects an instruction value to be given to a control target device by correcting a basic target value of a control amount.

While the operation of the control target device is controlled, the above-described series of processes of the operation control part 212 and the correction processing part 213 are repeated. The operation control part 212 repeats processing for generating an instruction value (60, 65) and giving the generated instruction value (60, 65) to a control target device. Thereby, the operation control part 212 controls the control target device to execute a predetermined operation by giving the plurality of instruction values (60, 65) to the control target device as time-series data of an operation amount. Meanwhile, a timing of the repetition and the number of instruction values (60, 65) generated at one time may not be particularly limited and may be appropriately determined in accordance with an embodiment. The operation control part 212 may repeat the above-described processing, for example, for each control cycle.

In FIG. 7, a situation where an instruction value at time t is determined is illustrated. The operation control part 212 acquires a measured value Y(t−a) of a control amount measured at time (t−a) which is time before time t. A prediction interval a may not be particularly limited, and may be appropriately determined in accordance with an embodiment. The prediction interval a may match, for example, an integer multiple (1 or more) of a control cycle or may be irrelevant to the control cycle. The prediction interval a may depend on, for example, a sensor that measures a control amount (for example, the position sensor 35). In a case where prediction control is not performed, the operation control part 212 determines an instruction value u(t) from a basic target value and a measured value Y(t−a) of a target control amount at time t and gives the determined instruction value u(t) to a control target device.

In a case where prediction control is performed, the correction processing part 213 predicts a predicted value P(t) of a control amount at time t from a measured value Y(t−a) using the prediction model 50. Subsequently, the correction processing part 213 acquires a corrected target value 63 by correcting a basic target value at time t in accordance with the predicted value P(t) using the corrector 55. The operation control part 212 determines an instruction value U(t) from the corrected target value 63 at time t and the measured value Y(t−a) and gives the determined instruction value U(t) to the control target device.

The data collecting part 214 collects a measured value and a predicted value of a control amount obtained through the above-described series of processes. The data collecting part 214 collects a measured value of a control amount obtained while the operation of a control target device is controlled by giving a plurality of instruction values (60, 65) to the control target device as time-series data of an operation amount. Thereby, the data collecting part 214 can generate first time-series data 223 indicating change in the value of the control amount. Similarly, the data collecting part 214 collects a measured value of a control amount obtained while the operation of a control target device is controlled by giving the instruction values 65 derived using the prediction model 50 to the control target device. Thereby, the data collecting part 214 can generate second time-series data 225 indicating change in the value of the control amount. In addition, the data collecting part 214 collects a predicted value obtained by the prediction model 50 at the time of deriving the instruction values 65. Thereby, the data collecting part 214 can generate prediction result data 227 indicating a series of predicted values obtained during prediction control.

<Others>

The software modules of the prediction control development device 1 and the PLC 2 will be described in detail in an operation example to be described later. Meanwhile, in the present embodiment, an example in which all of the software modules of the prediction control development device 1 and the PLC 2 are realized by a general-purpose CPU is described. However, some or all of the above-described software modules may be realized by one or a plurality of dedicated processors. In addition, with respect to the software configurations of the prediction control development device 1 and the PLC 2, omission, replacement, and addition of software modules may be appropriately performed in accordance with an embodiment.

§ 3 Operation Example

[PLC]

Figure 8:
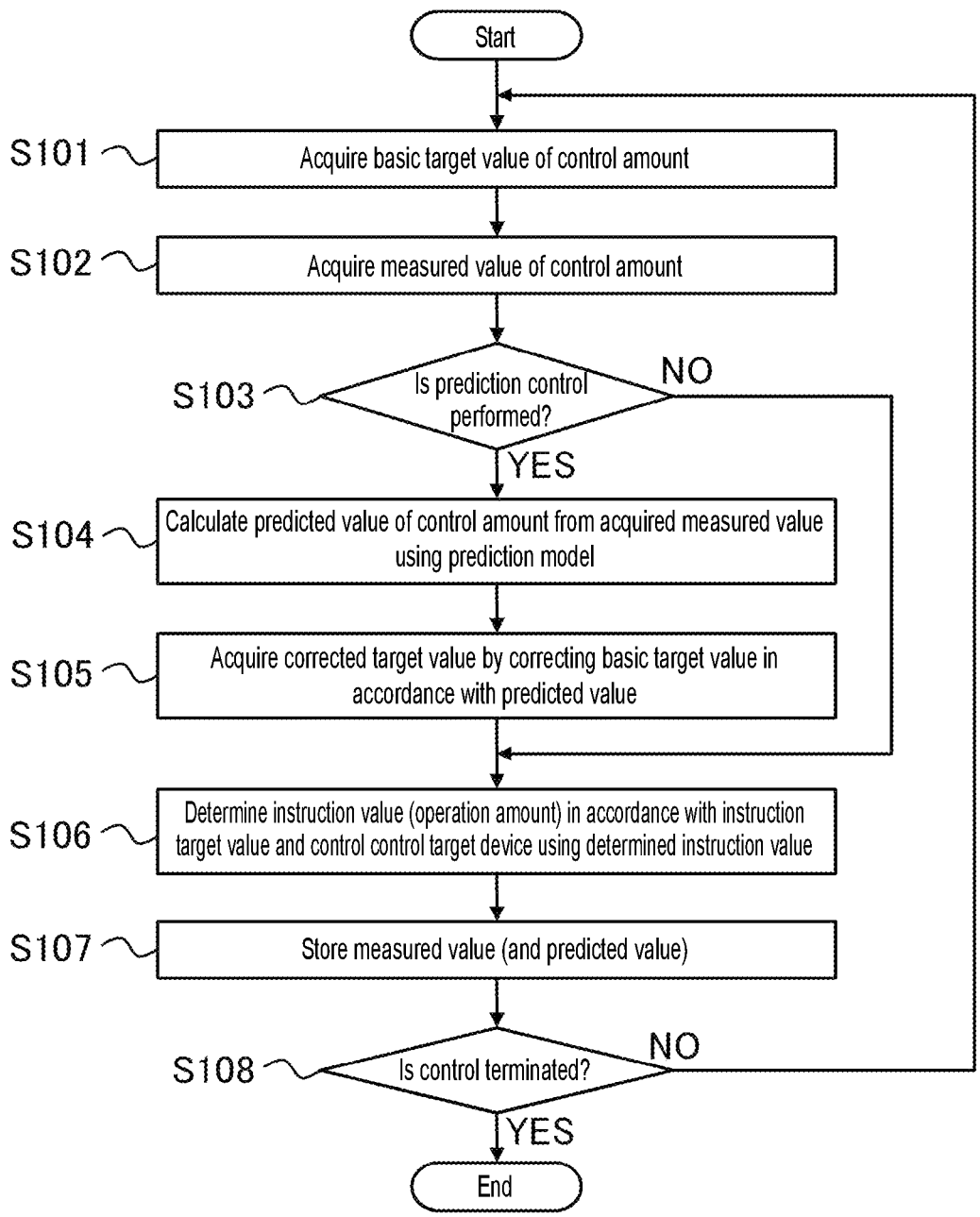
FIG. 8 illustrates an example of a processing procedure of the PLC (controller) according to the embodiment.

Next, an operation example of the PLC 2 according to the present embodiment will be described using FIG. 8. FIG. 8 is a flowchart illustrating an example of a processing procedure of the PLC 2 according to the present embodiment. However, a processing procedure to be described below is merely an example, and respective processes may be changed as much as possible. In addition, with respect to the processing procedure to be described below, omission, replacement, and addition of steps may be appropriately performed in accordance with an embodiment. The order of processes having not dependencies may be appropriately changed.

(Step S101)

In step S101, the control part 21 operates as the target value acquisition part 211 and acquires a basic target value which is a target control amount of a control target device.

In the present embodiment, the target value information 221 indicating a series of basic target values in a predetermined operation is held in the storage part 22. The target value information 221 may be appropriately generated to be able to cause the control target device to execute the predetermined operation. For example, each basic target value of the target value information 221 may be determined on the basis of a result of executing the predetermined operation on the control target device by an actual machine or a simulation. In addition, for example, each basic target value may be given by an operator's designation. The control part 21 acquires a basic target value of a control amount with reference to the target value information 221 stored in the storage part 22.

However, a path for acquiring the basic target value is not limited to such an example, and may be appropriately selected in accordance with an embodiment. For example, a target value of a control amount may be given in accordance with an instruction received from another information processing device, or may be given by an operator's designation. In addition, for example, the target value information 221 may be stored in another storage region such as an external storage device or a storage medium. The external storage device may be a data server such as a network attached storage (NAS) or may be an external storage device connected to the PLC 2. The storage medium may be, for example, a CD, a DVD, or the like. The control pan 21 may appropriately acquire the target value information 221 from another storage region.

In an example of the present embodiment, the control target device is the pressing machine 3, and a control amount is the position of the upper mold 32. In this case, each basic target value of the target value information 221 indicates a target position of the upper mold 32 at the time of forming the work piece 40 through the above-described production process. For example, each basic target value of the target value information 221 may be derived by determining the position of the upper mold 32 at each point in time so that a defect such as insufficient pressing does not occur in the product 41, on the basis of a result of causing the pressing machine 3 to execute the operation of the above-described production process by an actual machine or a simulation. When a basic target value of a control amount is acquired, the control part 21 causes the processing to proceed to the next step S102.

(Step S102)

In step S102, the control part 21 operates as the operation control part 212 and acquires a measured value of a control amount of the control target device.

A sensor may be appropriately used for the measurement of a control amount. The type of sensor may not be particularly limited and may be appropriately selected in accordance with a control target device and a control amount. In addition, the measurement of a control amount may be performed in a simulation or may be performed using the actual machine of the control target device. In addition, the control part 21 may directly acquire a measured value of a control amount from the control target device, or may indirectly acquire a measured value of a control amount from the control target device through another information processing device such as an external storage device or a storage medium.

In an example of the present embodiment, the pressing machine 3 includes the position sensor 35 for measuring the position of the upper mold 32 with respect to the lower mold 33. The control part 21 acquires a measured value of the position of the upper mold 32 which is obtained by the position sensor 35. When the measured value of the control amount is acquired, the control part 21 causes the processing to proceed to the next step S103.

(Step S103)

In step S103, the control part 21 operates as the operation control part 212 and determines whether or not to perform prediction control for the control target device. In an example of the present embodiment, the control part 21 determines whether or not to perform prediction control of the position of the upper mold 32 in the pressing machine 3.

Whether or not to perform prediction control for the control target device may be appropriately determined. For example, whether or not to perform prediction control for the control target device may be determined by another information processing device such as the prediction control development device 1 or an operator's instruction. In this case, the control part 21 may determine whether or not to perform prediction control by another information processing device or in response to an operator's instruction.

In addition, for example, the control part 21 may determine whether or not to perform prediction control in accordance with whether or not the prediction model 50 is held. That is, the control part 21 may determine that prediction control is performed in a case where the prediction model 50 is held, or may determine that prediction control is not performed in a case where the prediction model 50 is not held.

In a case where it is determined that prediction control is performed, the control part 21 causes the processing to proceed to the next step S104. On the other hand, in a case where it is determined that prediction control is not performed, the control part 21 omits the processes of steps S104 and S105 and causes the processing to proceed to the next step S106.

(Step S104)

In step S104, the control part 21 operates as the correction processing part 213 and predicts a predicted value of a control amount using the prediction model 50.

In the present embodiment, the control part 21 sets the prediction model 50 generated by the prediction control development device 1 with reference to the generated results data 125. The generated results data 125 may be distributed to the PLC 2 at any timing before the process of step S104 is executed. The control part 21 inputs a measured value of a control amount to the set prediction model 50 and executes operation processing of the prediction model 50. Thereby, the control part 21 calculates a predicted value of a control amount.

For example, in a case where the prediction model 50 is constituted by a self-regression model, the generated results data 125 indicates the value of an operation parameter such as a self-regression coefficient in each term. The control part 21 performs the setting of a regression expression of the prediction model 50 with reference to the generated results data 125. Next, the control part 21 inputs a measured value of a control amount to each term of the regression expression to execute operation processing of the regression expression. The control part 21 can acquire a predicted value of a control amount based on the operation result.

In addition, for example, in a case where the prediction model 50 is constituted by a neural network, the generated results data 125 indicates the value of an operation parameter such as a weight of coupling between neurons or a threshold value of each neuron. The control part 21 performs setting of a learned neural network with reference to the generated results data 125. Next, the control part 21 inputs a measured value of a control amount to an input layer of the neural network and performs ignition determination for each neuron included in each layer from an input layer in order. Thereby, the control part 21 can acquire an output value (that is, a predicted value of a control amount) corresponding to a result of the prediction of a control amount from an output layer.

Meanwhile, in a case where the prediction model 50 is configured to be able to further input other data other than the value of a control amount such as the value of an operation amount and individual information of the work piece 40, the control part 21 further acquires other data before executing step S104. A method of acquiring other data may not be particularly limited, and may be appropriately determined in accordance with an embodiment. The control part 21 can acquire a predicted value of a control amount by further inputting the obtained other data to the prediction model 50 and executing operation processing of the prediction model 50.

In an example of the present embodiment, the control part 21 acquires a predicted value indicating the position of the upper mold 32 which is predicted after time a. When a predicted value of a control amount is acquired, the control part 21 causes the processing to proceed to the next step S105.

(Step S105)

In step S105, the control part 21 acquires a corrected target value 63 by correcting a basic target value in accordance with a predicted value predicted by the prediction model 50. In the present embodiment, the corrector 55 is used to correct the basic target value. The corrector 55 is configured to calculate the corrected target value 63 from the basic target value in accordance with a predicted value of a control amount.

The corrector 55 may be constituted by an operation module such as a calculation expression or the like indicating a relationship between a predicted value of a control amount and a correction amount. The relationship between the predicted value of the control amount and the correction amount may not be particularly limited, and may be appropriately determined in accordance with an embodiment. A deviation of a predicted value obtained by the prediction model 50 from a basic target value may be equivalent to the fact that it is predicted that the control target device operates due to a deviating action from the basic target value due to the influence of disturbance or the like even when the control target device is controlled as it is based on the basic target value. Consequently, for example, a relationship between a predicted value of a control amount and a correction amount may be given to reduce a deviation between the predicted value of the correction amount and the basic target value. As an example, the corrector 55 may be configured to correct the basic target value to a large value in a case where the predicted value is smaller than the basic target value, and may be configured to correct the basic target value to a small value in a case where the predicted value is larger than the basic target value. Thereby, it is possible to correct the target value of the control amount so that the control target device to operate can be operated with an action according to the basic target value. Such a relationship between the predicted value of the control amount and the correction amount may be given by, for example, the following Expression 1.

[Math. 1]

$$R(t)=r(E(t)-P(t))+s \qquad \text{Expression (1)}$$

Meanwhile, R(t) indicates the value of a correction amount (correction value) at time t. In addition, r indicates a proportional constant. E(t) indicates a basic target value of a control amount at time t P(t) indicates a predicted value of a control amount at time t. Further, s indicates a constant term.

In this calculation expression, the degree of correction is determined in accordance with the values of the proportional constant r and the constant term s. The proportional constant r and the constant term s are examples of a weight for determining the degree of correction. The values of r and s may be determined through step S204 to be described later.

In the present embodiment, the corrector 55 may be constituted by an operation module of the calculation expression. However, a relationship between the predicted value of the control amount and the correction amount is not limited to the example of Expression 1, and may be appropriately determined in accordance with an embodiment. In addition, the configuration of the corrector 55 is not limited to the above-described example, and may be appropriately determined in accordance with an embodiment.

The control part 21 calculates a correction value R(t) by substituting the predicted value and the basic target value of the acquired control amount into each term of Expression 1 and executing the operation processing of Expression 1. That is, the control part 21 calculates a difference between the basic target value and the predicted value and determines a correction value R(t) based on the calculated difference and a weight. Specifically, the control part 21 calculates the correction value R(t) by calculating a product of the calculated difference and the proportional constant r and adding the constant term s to the calculated product. In addition, the control part 21 can calculate the corrected target value 63 by adding the correction value R(t) to the basic target value. This addition processing may be realized by subtraction processing. When the corrected target value 63 is acquired, the control part 21 causes the processing to proceed to the next step S106.

(Step S106)

In step S106, the control part 21 operates as the operation control part 212 and determines an instruction value (operation amount) in accordance with an instruction target value of a control amount. In a situation where prediction control is performed, the corrected target value 63 obtained in step S105 is treated as an instruction target value. On the other hand, in a situation where prediction control is not performed, that is, a situation where normal control is performed, the basic target value of the control amount obtained by step S101 is treated as an instruction target value as it is.

A method of determining an instruction value may be appropriately selected in accordance with an embodiment. As the method of determining an instruction value, for example, a known method such as PID control or PI control may be adopted. In this case, the control part 21 calculates a difference between a set instruction target value and a measured value of a control amount and determines an instruction value in accordance with the calculated difference. The control part 21 controls the operation of the control target device by giving the determined instruction value to the control target device.

Specifically, in a case where prediction control is not performed, the control part 21 controls the operation of the control target device by determining an instruction value 60 in accordance with a difference between a basic target value and a measured value and giving the determined instruction value 60 to the control target device. On the other hand, in a case where prediction control is performed, the control part 21 controls the operation of the control target device by determining an instruction value 65 in accordance with a difference between a corrected target value 63 and a measured value and giving the determined instruction value 65 to the control target device.

In an example of the present embodiment, the instruction value (60, 65) indicates a voltage applied to the servo motor driving the upper mold 32 in order to move the upper mold 32 to a target position. The control part 21 controls the position of the upper mold 32 in the pressing machine 3 by giving the instruction value (60, 65) to the servo driver 31. The control of the operation may be performed in a simulation or may be performed using the actual machine of the control target device. When the operation of the control target device is controlled using the instruction value (60, 65), the control part 21 causes the processing to proceed to the next step S107.

(Step S107)

In step S107, the control part 21 operates as the data collecting part 214 and stores the measured value of the control amount obtained in step S102 in a predetermined storage region. In a case where prediction control is performed, the control part 21 further stores the predicted value of the control amount obtained in step S104 in a predetermined storage region. The predetermined storage region may be, for example, the storage part 22, an external storage device, a storage medium, or the like. When the measured value (and the predicted value) is stored, the control part 21 causes the processing to proceed to the next step S108.

(Step S108)

In step S108, the control part 21 operates as the operation control part 212 and determines whether or not to terminate the control of the control target device.

Whether or not to terminate the control of the control target device may be appropriately determined. For example, whether or not to terminate the control of the control target device may be determined by another information processing device such as the prediction control development device or an operator's instruction. In this case, the control part 21 may determine whether or not to terminate the control of the control target device by another information processing device or in response to an operator's instruction.

In addition, for example, the control part 21 may determine whether or not to terminate the control of the control target device in accordance with whether or not a series of operations executed by the control target device, such as the forming of the work piece 40 through the above-described production process, has been completed. That is, in a case where the series of operations executed by the control target device has been completed, the control part 21 may determine that the control of the control target device is terminated. In this case, the control part 21 may determine that the control of the control target device is terminated in accordance with a series of operations being repeatedly executed a plurality of times. In addition, the control part 21 may determine that the control of the control target device is terminated in accordance with the elapse of a predetermined period of time for which the series of operations is repeated. On the other hand, in a case where the series of operations executed by the control target device has not been completed, the control part 21 may determine that the control of the control target device is not terminated.

In a case where it is determined that the control of the control target device is terminated, the control part 21 terminates the processing according to the present operation example. On the other hand, in a case where it is determined that the control of the control target device is not terminated, that is, the control of the control target device is continued, the control part 21 returns to step S101 to repeat the processes of steps S101 to S107.

In a process of repeating the processes of steps S101 to S107, the control part 21 controls the control target device to execute a predetermined operation by giving a plurality of instruction values (60, 65) to the control target device as time-series data of an operation amount. In an example of the present embodiment, it is possible to generate a formed product 41 by performing control using the actual machine of the pressing machine 3. Meanwhile, a timing of the repetition and the number of instruction values (60, 65) generated at one time may not be particularly limited and may be appropriately determined in accordance with an embodiment. The control part 21 may repeat the processes of steps S101 to S107, for example, for each control cycle.

Further, in the process of repetition, the control part 21 collects a measured value and a predicted value of a control amount through the process of step S107. In a situation where the prediction model 50 is generated by the prediction control development device 1, the control part 21 collects a measured value of a control amount obtained while the operation of the control target device is controlled by giving the plurality of instruction values (60, 65) to the control target device as time-series data of an operation amount. Thereby, the control part 21 can generate first time-series data 223 indicating change in the value of the control amount in time series.

Similarly, in a situation where the accuracy of prediction performed using the prediction model 50 generated by the prediction control development device 1 is verified, the control part 21 collects a measured value of a control amount obtained while the operation of the control target device is controlled by giving the instruction values 65 derived using the generated prediction model 50 to the control target device. Thereby, the control part 21 can generate second time-series data 225 indicating change in the value of the control amount in time series. Further, in this situation, the control part 21 collects the predicted value of the control amount calculated in step S104. Thereby, the control part 21 can generate prediction result data 227 indicating a series of predicted values of control amounts obtained during prediction control in time series.

Meanwhile, after the above-described series of processes has is completed or while the processes of steps S101 to S107 are repeated, the control part 21 may collect a measured value of a control amount at the time of normally operating the control target device. In an example of the present embodiment, the control part 21 may collect measured values of a series of positions of the upper mold 32 when a defect does not occur in the product 41. In addition, the control part 21 may update the target value information 221 by correcting basic target values based on the collected measured values. For example, the control part 21 may correct each of the basic target values to reduce a deviation from a measured value at a point in time corresponding to the basic target value. In addition, for example, the control part 21 may update the target value information 221 by setting the collected measured values to new basic target values.

[Prediction Control Development Device]

Figure 9:
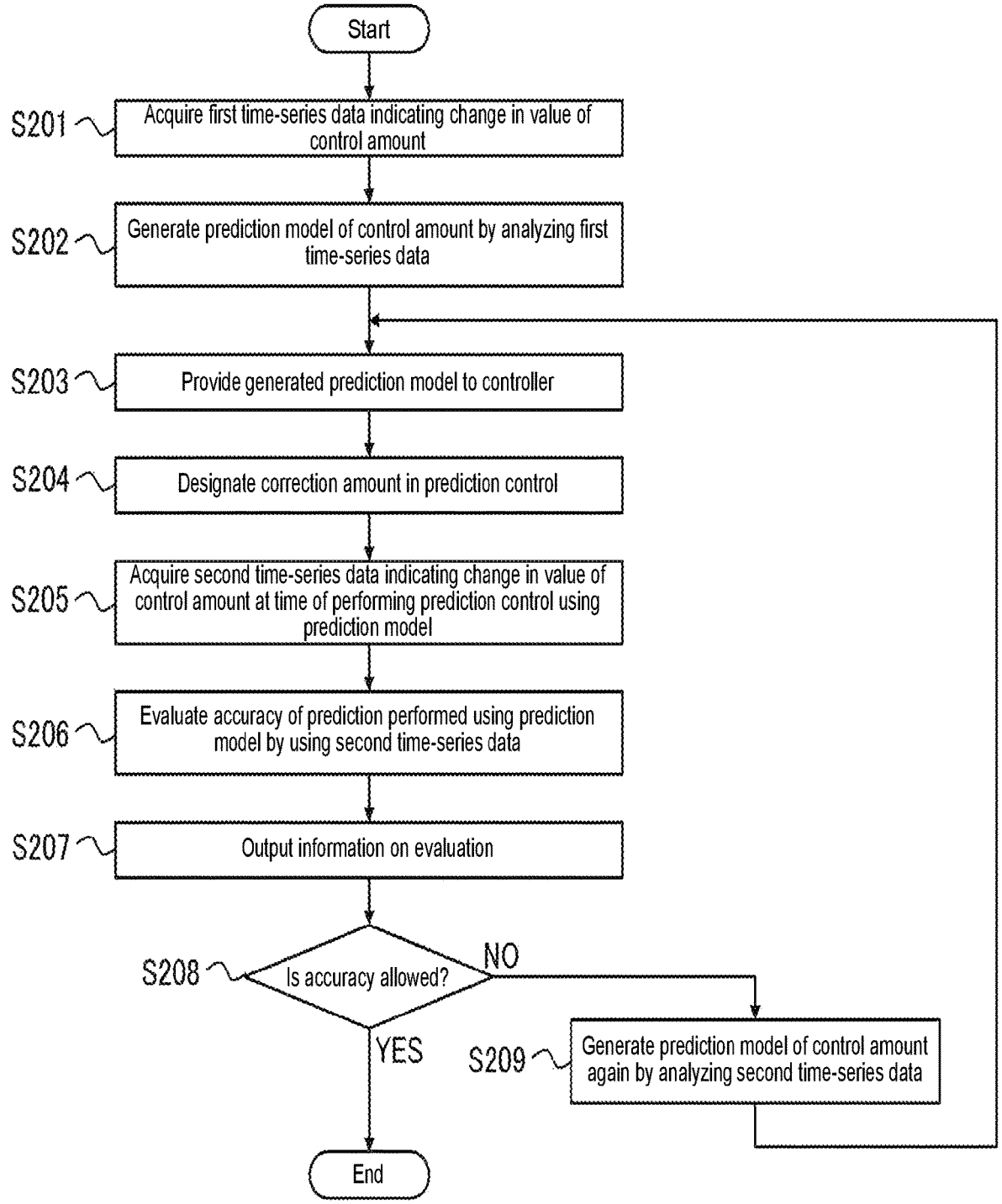
FIG. 9 illustrates an example of a processing procedure of the prediction control development device according to the embodiment.

Next, an operation example of the prediction control development device 1 according to the present embodiment will be described using FIG. 9. FIG. 9 is a flowchart illustrating an example of a processing procedure of the prediction control development device 1 according to the present embodiment. The processing procedure of the prediction control development device 1 is an example of a "prediction control development method" of the present invention. However, the processing procedure to be described below is merely an example, and respective processes may be changed as much as possible. In addition, with respect to the processing procedure to be described below, omission, replacement, and addition of steps may be appropriately performed in accordance with an embodiment. The order of processes having not dependencies may be appropriately changed.

(Step S201)

In step S201, the control part 11 operates as the first acquisition part 111 and acquires first time-series data 223 indicating change in the value of a control amount of the control target device while a controller is controlling the control target device by giving a plurality of instruction values to the control target device as time-series data of an operation amount.

In the present embodiment, the control part 11 can acquire the first time-series data 223 from the PLC 2. The control part 11 may directly acquire the first time-series data 223 from the PLC 2 or may indirectly acquire the first time-series data 223 from the PLC 2 through, for example, an external storage device, the storage medium 91, or the like. However, an acquisition destination of the first time-series data 223 is not limited to such an example, and may be appropriately selected in accordance with an embodiment. For example, the first time-series data 223 may be generated by another information processing device other than the PLC 2. In this case, the control part 11 may acquire the first time-series data 223 from another information processing device.

As described above, the first time-series data 223 may be data obtained by operating the control target device through normal control instead of prediction control, or may be data obtained by operating the control target device through prediction control. In a case where the first time-series data 223 is data obtained through prediction control, a prediction model generated before the present step S201 is given to the PLC 2 in advance. The prediction model given in advance may be a model generated by the prediction control development device 1 by a similar method to the prediction model 50 generated by the following process of step S202 and the subsequent processes, or may be a model generated by another information processing device.

In an example of the present embodiment, the first time-series data 223 indicates measured values of the position of the upper mold 32 while the PLC 2 is controlling the operation of the pressing machine 3 in time series, by giving a plurality of instruction values (60, 65) to the servo driver 31. When the first time-series data 223 is acquired, the control part 11 causes the processing to proceed to the next step S202.

(Step S202)

In step S202, the control part 11 operates as the model generation part 112, generates a prediction model 50 of a control amount by analyzing the acquired first time-series data 223, and generates generated results data 125 indicating the generated prediction model 50.

A method of analyzing time-series data in order to generate the prediction model 50 may not be particularly limited and may be appropriately selected in accordance with the type of prediction model 50. In the present embodiment, the prediction model 50 is configured to include an operation parameter for calculating a predicted value from an input value of a control amount. The control part 11 generates the prediction model 50 by analyzing the first time-series data 223 to derive the value of the operation parameter.

For example, in a case where the prediction model 50 is constituted by a self-regression model, the control part 11 derives the value of the operation parameter such as a self-regression coefficient from the first time-series data 223 by a known regression analysis method such as a least-squares method. Thereby, the control part 11 can generate the prediction model 50. The control part 11 generates data indicating a regression expression including a self-regression coefficient, which is derived in each term, as generated results data 125.

In addition, for example, in a case where the prediction model 50 is constituted by a machine learning model such as a neural network, the control part 11 derives the value of an operation parameter of the machine learning model by a known machine learning method by using the first time-series data 223 as learning data. As an example, in a case where the prediction model 50 is constituted by a neural network, the control part 11 executes machine learning of the prediction model 50 by using a sample at any time of the first time-series data 223 as training data and using a sample at the time later than any time as teacher data. Specifically, the control part 11 trains the prediction model 50 to output an output value conforming to teacher data with respect to an input of training data by adjusting the value of an operation parameter by an error backward propagation method. Thereby, the control part 11 can generate the prediction model 50.

The control part 11 generates data indicating the value of the derived operation parameter and the structure of the prediction model 50 (for example, the number of layers, the number of neurons included in each layer, a coupling relationship between neurons of adjacent layers, or the like) as the generated results data 125.

In a case where the prediction model 50 is configured to be able to further input other data other than the value of a control amount such as the value of an operation amount and individual information of the work piece 40, the control part 11 further acquires other data. A method of acquiring other data may not be particularly limited and may be appropriately determined in accordance with an embodiment. The control part 11 further uses the obtained other data in the above-described analysis. For example, in a case where the prediction model 50 is constituted by a self-regression model, the control part 11 further uses the obtained other data for the derivation of a self-regression coefficient. Further, for example, in a case where the prediction model 50 is constituted by a neural network, the control pan 11 further uses the obtained other data as training data in the above-described machine learning processing. Thereby, the control part 11 can generate the prediction model 50 configured to output a predicted value of a control amount with respect to inputs of the value of a control amount and data other than the value of the control amount.

In an example, the prediction model 50 is configured to predict the position of the upper mold 32 in the pressing machine 3 through the process of the present step S202. Meanwhile, the control part 11 may delete an unnecessary portion in the first time-series data 223. When the prediction model 50 is generated, the control part 11 causes the processing to proceed to the next step S203.

(Step S203)

In step S203, the control part 11 operates as the model providing part 113 and distributes the generated results data 125 to the controller to provide the generated prediction model 50 to the controller.

A method of distributing the generated results data 125 may be appropriately determined in accordance with an embodiment. For example, the control part 11 may directly distribute the generated results data 125 to the controller through a network by its own processing or in response to a request received from the controller. In addition, for example, the control part 11 may transmit the generated results data 125 to an external mechanism device such as a data server and cause the controller to acquire the generated results data 125 stored in the external storage device. Similarly, the control part 11 may store the generated results data 125 in a storage medium such as the storage medium 91 and cause the controller to acquire the generated results data 125 stored in the storage medium. In this manner, the control part 11 may indirectly distribute the generated results data 125 to the controller.

Thereby, the controller can execute prediction control of the control target device by correcting instruction values in accordance with a predicted value of a control amount predicted by the prediction model 50 and giving the corrected instruction values to the control target device. In an example of the present embodiment, the generated prediction model 50 is provided to the PLC 2. The PLC 2 can execute prediction control of the pressing machine 3 by using the provided prediction model 50 through the above-described processes of steps S104 to S106. When the generated prediction model 50 is provided to the controller, the control part 11 causes the processing to proceed to the next step S204.

(Step S204)

In step S204, the control part 11 operates as the correction amount designation part 114 and designates a correction amount for each instruction value in the controller. A method of designating the correction amount may be appropriately determined in accordance with a method of correcting an instruction value in prediction control. In an example of the present embodiment, the degree of correction for an instruction value is determined in accordance with the values of the proportional constant r and the constant term s in the above-described Expression 1. For this reason, the control part 11 designates a correction amount for each instruction value by determining at least any one of the proportional constant r and the constant term s. Thereby, the PLC 2 can execute the correction of an instruction value in prediction control of the pressing machine 3 according to the correction amount designated by the prediction control development device 1.

Meanwhile, a method of determining the value of a correction amount (in the present embodiment, the value of at least any one of the proportional constant r and the constant term s) may be appropriately selected in accordance with an embodiment. For example, the value of a correction amount may be manually determined by an operator's designation. In this case, the control part 11 may receive the operator's designation through the input device 14 and determine the value of a correction amount in accordance with the operator's designation. In addition, for example, the control part 11 may automatically determine the value of a correction amount in accordance with a template or the like. When a correction amount is designated, the control part 11 causes the processing to proceed to the next step S205.

(Step S205)

In step S205, the control part 11 operates as the second acquisition part 115 and acquires second time-series data 225 indicating change in the value of a control amount of the control target device while the controller is controlling the control target device by giving the corrected instruction values to the control target device.

In the present embodiment, similarly to the first time-series data 223, the control part 11 can acquire the second time-series data 225 from the PLC 2. The control part 11 may directly acquire the second time-series data 225 from the PLC 2 or may indirectly acquire the second time-series data 225 from the PLC 2 through, for example, an external storage device, the storage medium 91, or the like. In addition, the second time-series data 225 may be generated by another information processing device other than the PLC 2. In this case, the control part 1 may acquire the second time-series data 225 from another information processing device.

In an example, the second time-series data 225 indicates measured values of the position of the upper mold 32 in time series while the PLC 2 performs prediction control of the operation of the pressing machine 3 by giving the instruction values 65 derived using the prediction model 50 to the servo driver 31. When the second time-series data 225 is acquired, the control part 11 causes the processing to proceed to the next step S206.

(Steps S206 and S207)

In step S206, the control part 11 evaluates whether or not the accuracy of prediction performed using the prediction model 50 is acceptable based on a difference between a predicted value of a control amount predicted by the prediction model 50 and the value of a control amount indicated by the second time-series data 225. In step S207, the control part 11 operates as the output part 117 and displays information on the evaluation of the accuracy of prediction performed using the prediction model 50 on the display device 15. The information on the evaluation may include the predicted value of the control amount predicted by the prediction model 50 and the value of the control amount indicated by the second time-series data 225.

In the present embodiment, the prediction result data 227 indicating a predicted value of a control amount predicted at each point in time is generated in the process of executing prediction control through the above-described process of step S107 of the PLC 2. For this reason, the control part 11 can acquire the prediction result data 227 from the PLC 2 as information indicating a predicted value of a control amount predicted by the prediction model 50. However, a method of acquiring a predicted value is not limited to such an example. For example, the control part 11 may acquire a predicted value of a control amount by inputting the values of control amounts indicated by the second time-series data 225 to the prediction model 50 and executing operation processing of the prediction model 50.

In addition, a method of evaluating the accuracy of prediction performed using the prediction model 50 may be appropriately determined in accordance with an embodiment. In the present embodiment, it can be evaluated that the accuracy of prediction performed using the prediction model 50 becomes lower as a deviation between a predicted value and a measured value of a control amount at the corresponding time increases. Consequently, in step S206, the control part 11 may calculate the degree of a difference between the predicted value of the control amount indicated by the prediction result data 227 and the measured value of the control amount indicated by the second time-series data 225 and compare the calculated degree of the difference with a threshold value. The threshold value may be appropriately determined. In addition, the control part 11 may evaluate that the accuracy of prediction performed using the prediction model 50 is not acceptable in a case where the calculated degree of the difference exceeds the threshold value, and otherwise, the control part 11 may evaluate that the accuracy of prediction performed using the prediction model 50 is acceptable. The degree of the difference may be represented by, for example, a total value of differences, a ratio of differences, or the like. Thereby, the control part 11 may automatically evaluate whether or not the accuracy of prediction performed using the prediction model 50 is acceptable. Meanwhile, in this case, the control part 11 may execute the process of step S207 at either timing before or after step S206.

In addition, for example, the control part 11 may execute the process of step S207 before executing step S206 to output information on the evaluation of the accuracy of prediction performed using the prediction model 50 to the display device 15. The information may include the predicted value of the control amount predicted by the prediction model 50 and the measured value of the control amount indicated by the second time-series data 225. In addition, the information may include a result obtained by calculating the degree of a difference between the predicted value of the control amount indicated by the prediction result data 227 and the measured value of the control amount indicated by the second time-series data 225. Accordingly, the control part 11 may receive an operator's input regarding whether or not the accuracy of prediction performed using the prediction model 50 is acceptable through the input device 14 in the process of step S206. In this case, the control part 11 can evaluate whether or not the accuracy of prediction performed using the prediction model 50 is acceptable in accordance with an operator's input. In this manner, it may be manually evaluated whether or not the accuracy of prediction performed using the prediction model 50 is acceptable.

Figure 10:
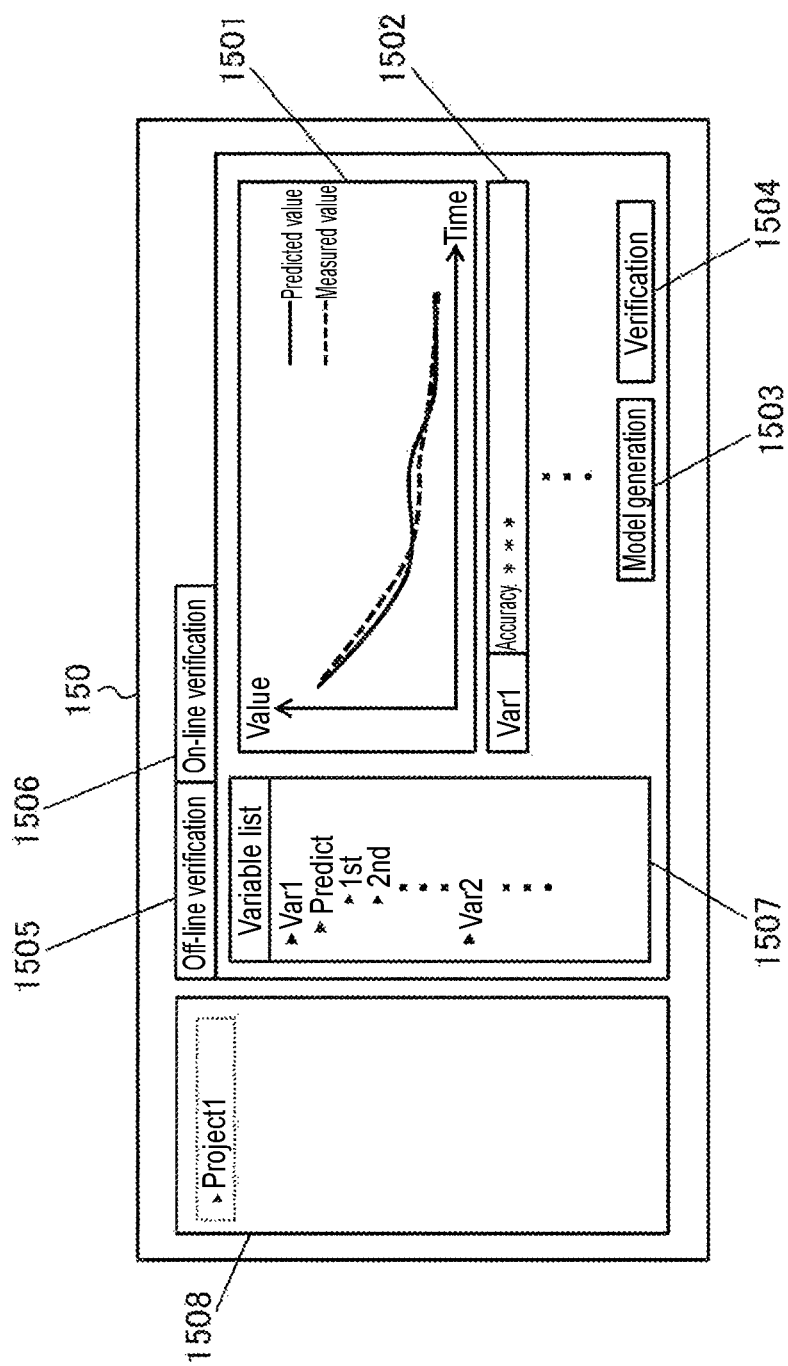
FIG. 10 schematically illustrates an example of an output screen for an evaluation result according to the embodiment.

FIG. 10 schematically illustrates an example of a screen 150 which is output to the display device 15 by step S207 The screen 150 is divided into a plurality of regions (1501, 1502, 1507, 1508). Predicted values of control amounts predicted by the prediction model 50 and measured values of control amounts indicated by the second time-series data 225 are displayed in time series in the region 1501. Information on a result obtained by calculating the degree of a difference between a predicted value and a measured value of a control amount is displayed in the region 1502. In the example of FIG. 10, the value of the accuracy of prediction performed using the prediction model 50 is displayed in the region 1502 as the information on a result obtained by calculating the degree of a difference.

A list of variables corresponding to a control target (for example, the servo motor driving the upper mold 32) is displayed in the region 1507. When a variable is selected from the region 1507, information on a control target corresponding to the selected variable is displayed in the region 1501 and the region 1502. A list of projects for generating the prediction model 50 is displayed in the region 1508. The project may be generated for each unit of control such as a production line or a control target device. When the project is selected from the region 1508, information on the selected project is displayed in each region (1501, 1502, 1507).

In addition, the screen 150 includes a plurality of buttons 1503 to 1506. The button 1503 is used to generate the prediction model 50 by step S202 or step S209 to be described later. The button 1504 is used to verify the accuracy of prediction performed by the generated prediction model 50, that is, to execute the processes of steps S205 and S206. After the prediction model 50 is generated, the button 1503 may be used to receive the accuracy of prediction performed using the prediction model 50 being not acceptable.

In addition, a pair of buttons (1505, 1506) are used to switch a mode for executing a series of verification processes of the prediction model 50. In the present embodiment, two modes of off-line verification and on-line verification are prepared as a mode for executing a series of verification processes of the prediction model 50. The off-line verification is a mode for verifying the accuracy of prediction performed using the prediction model 50 by executing the processes of steps S205 and S206 after the second time-series data 225 and the prediction result data 227 are collected from the PLC 2. On the other hand, the on-line verification is a mode for verifying the accuracy of prediction performed using the prediction model 50 by connecting to the PCL 2 and executing the processes of steps S205 and S206 while collecting the second time-series data 225 and the prediction result data 227 from the PLC 2 in real time. The control part 11 executes the processes of steps S205 and S206 in any mode of the off-line verification and the on-line verification in accordance with selection using the pair of buttons (1505, 1506).

In an example, the control part 11 evaluates whether or not the accuracy of prediction of the position of the upper mold 32 which is performed by the prediction model 50 is acceptable in the prediction control of the pressing machine 3 which is performed by the PLC 2. When the accuracy of prediction performed using the prediction model 50 is evaluated and information on the evaluation is output to the display device 15, the control part 11 causes the processing to proceed to the next step S208.

(Step S208)

In step S208, the control part 11 determines a branch destination of processing based on the evaluation result in step S206. In a case where it is evaluated in step S206 that the accuracy of prediction performed using the prediction model 50 is not acceptable, the control part 11 causes the processing to proceed to the next step S209. On the other hand, in a case where it is evaluated in step S206 that the accuracy of prediction performed using the prediction model 50 is acceptable, the control part 11 terminates the processing according to the present operation example.

(Step S209)

In step S209, the control part 11 operates as the model generation part 112 and generates the prediction model 50 for a control amount again by analyzing the acquired second time-series data 225. The control part 11 generates a new prediction model 50 using the second time-series data 225 through a similar process to the above-described step S202. In addition, the control part 11 updates the generated results data 125 to indicate the generated new prediction model 50. Meanwhile, the control part 11 may delete an unnecessary portion in the second time-series data 225.

When the prediction model 50 is updated, the control part 11 returns to step S203 to repeat the processes of steps S203 to S207. In step S203, the control part 11 operates as the model providing part 113 and distributes the updated generated results data 125 to the controller to provide the prediction model 50 generated again to the controller. Thereby, the control part 11 updates the prediction model 50 held in the controller.

Accordingly, the controller can execute prediction control of the control target device using the updated prediction model 50. In step S205, the control part 11 acquires the second time-series data 225 on the prediction control using the updated prediction model 50. In step S206, the control part 11 evaluates whether or not the accuracy of prediction performed by the updated prediction model 50 is acceptable. A series of processes of the generation and evaluation of the prediction model 50 may be repeated until the accuracy of prediction performed using the prediction model 50 is acceptable.

Meanwhile, basically, it is assumed that the accuracy of prediction performed using the prediction model 50 to be generated improves whenever the generation of the prediction model 50 is repeated. Consequently, in a case where the generation of the prediction model 50 is repeated, the control part 11 may determine the value of a correction amount so that the correction amount is increased whenever the prediction model 50 is updated, through the process of step S204. For example, the control part 11 may increase the value of the correction amount by adding or multiplying a predetermined value to or by the value of the correction amount whenever the prediction model 50 is updated. The predetermined value and the initial values of the correction amount may be appropriately given. The predetermined value and the initial values of the correction amount may be manually determined, for example, by an operator's designation or the like or may be automatically determined by a template or the like. Thereby, it is possible to achieve an improvement in the accuracy of prediction performed using the prediction model 50 while gradually increasing the degree of prediction control using the prediction model 50 and to optimize the prediction control so that the operation of the control target device can be appropriately controlled.

[Features]

As described above, the prediction control development device 1 according to the present embodiment can verify the accuracy of prediction performed using the prediction model 50 through steps S205 and S206 after the prediction model 50 is provided to the controller. In addition, as a result of the verification, in a case where the accuracy of prediction performed using the prediction model 50 is not acceptable for the use of prediction control, the prediction control development device 1 generates a new prediction model 50 based on second time-series data 225 newly obtained under an environment in which the prediction model 50 is provided, through step S209. The prediction control development device 1 can repeat this series of processes to improve the accuracy of prediction performed using the prediction model 50 under an environment in which the control target device is operated.

The improvement in the prediction model 50 through the repetition of this series of processes may be executed before the control target device is actually operated, or may be executed while actually operating the control target device. That is, the prediction control development device 1 according to the present embodiment can continuously improve the accuracy of prediction performed using the prediction model 50 even while the prediction model 50 is actually operated. Thus, according to the prediction control development device 1 according to the present embodiment, when not only a large-scale production device but also a relatively small-scale production device such as the pressing machine 3 is used as the control target device, it is possible to generate the prediction model 50 making it possible to predict a control amount with high accuracy. In an example of the present embodiment, it is possible to optimize a factory process including the pressing machine 3 and reduce a possibility that a defect will occur in a product 41 to be produced.

§ 4 Modification Example

Although the embodiment of the present invention has been described above in detail, the above description is merely an example of the present invention in all respects. It is needless to say that various improvements and modifications can be made without departing from the scope of the present invention. For example, the following change can be performed. Meanwhile, hereinafter, the same reference numerals and signs are used for the same components as those in the above-described embodiment, and description of the same points as those in the above-described embodiment will be appropriately omitted. The following modification examples can be appropriately combined.

<4.1>

In the above-described embodiment, the number of control target devices is not limited to one, and may be appropriately determined in accordance with an embodiment. Further, in an example of the above-described embodiment, the control target device is the pressing machine 3. However, the type of control target device is not limited to such an example, may be appropriately selected in accordance with an embodiment. The control target device may be a relatively small-scale production device used in a production line, such as a web conveyance device, an injection molding machine, an NC lathe, an electric discharge machine, and a packaging machine, in addition to the pressing machine. The operation of the relatively small-scale production device may be controlled by, for example, a small-scale control device represented by a PLC. Further, in an example of the above-described embodiment, a control amount is the position of the upper mold 32, and an operation amount is a voltage of the servo motor driving the upper mold 32. However, the control amount and the operation amount are not limited to such examples and may be appropriately selected in accordance with a control target device.

Figure 11:
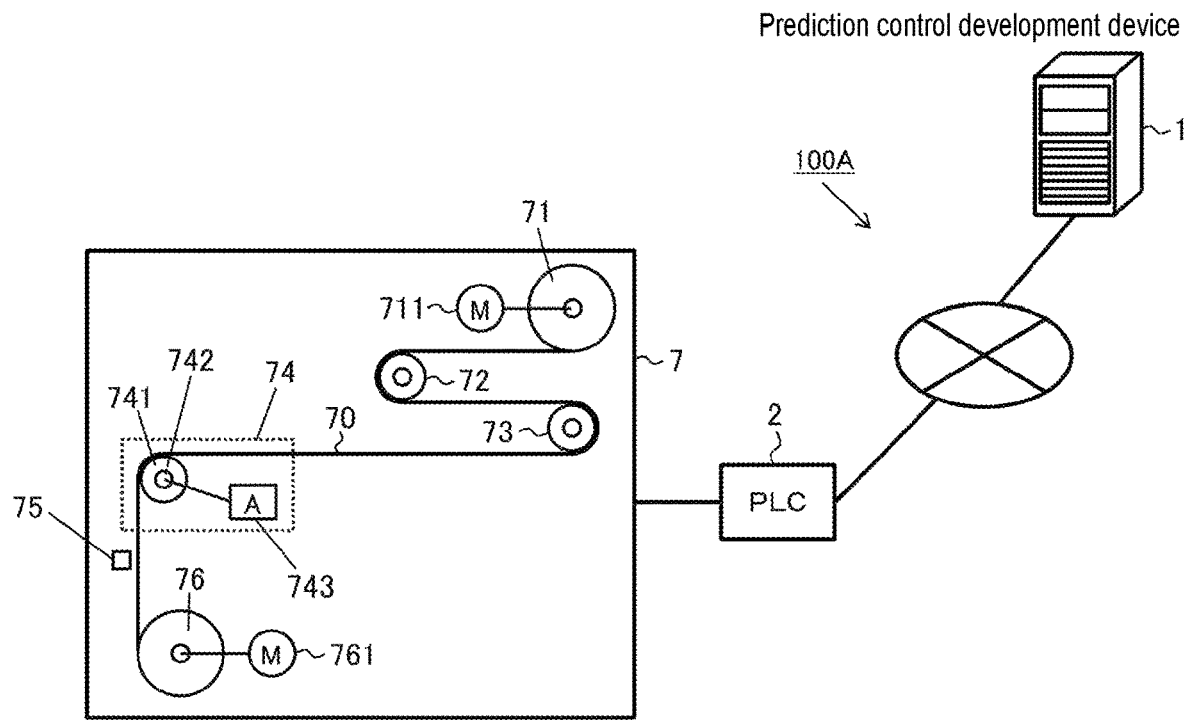
FIG. 11 schematically illustrates another example of a situation to which the present invention is applied.

FIG. 11 schematically illustrates an example of a situation to which a prediction control system 100A according to the present modification example is applied. The prediction control system 100A includes a prediction control development device 1 and a PLC 2, similar to the prediction control system 100 according to the above-described embodiment. In the present modification example, a web conveyance device 7 is connected to the PLC 2, instead of the pressing machine 3. Except for this point, the present modification example is configured similarly to the above-described embodiment. The web conveyance device 7 is another example of a control target device. The web conveyance device 7 is configured to convey a web 70 while adjusting the position of the end of the web 70.

Figure 12:
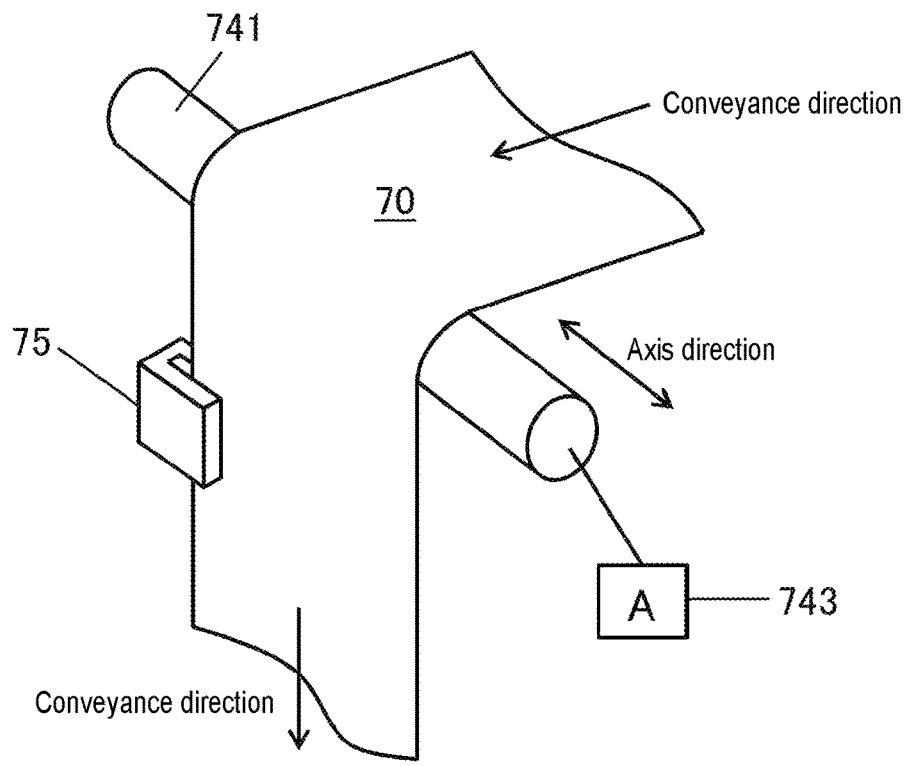
FIG. 12 schematically illustrates a situation in which the position of an end of a web conveyed in a web conveyance device of FIG. 11 is adjusted.

An example of a configuration of the web conveyance device 7 will be described further using FIG. 12. FIG. 12 schematically illustrates a situation in which the position of the end of the web 70 is adjusted in the web conveyance device 7. As illustrated in FIG. 11, the web conveyance device 7 according to the present modification example includes a supply roll 71 supplying the web 70 and a recovery roll 76 recovering the supplied web 70. The type of web 70 may not be particularly limited and may be appropriately selected in accordance with an embodiment. The web 70 may be a resin film such as a polyethylene film. A servo motor (711, 761) is attached to a rotation shaft of each of the supply roll 71 and the recovery roll 76. Thereby, by driving the servo motors (711, 761), the web 70 is unwound from the supply roll 71, and the supplied web 70 is wound on the recovery roll 76.

Three driven rollers (72, 73, 741) are disposed between the supply roll 71 and the recovery roll 76. In the driven roller 741 among these driven rollers, a correction device 74 configured to correct (that is, displace) the position of the end of the web 70 is provided. As illustrated in FIG. 12, the correction device 74 includes the driven roller 741 and an actuator 743. The driven roller 741 includes a shaft 742, and is configured to be rotatable around the shaft 742 and to convey the web 70. In addition, the actuator 743 is attached to the shaft 742, and the driven roller 741 is configured to be slidable in a shaft direction due to the driving of the actuator 743. According to the correction device 74, it is possible to correct the position of the end of the web 70 by sliding the driven roller 741 in the shaft direction due to the driving of the actuator 743. Specifically, it is possible to displace the position of the end of the web 70 according to the amount of sliding in a direction in which the driven roller 741 is slid.

An edge sensor 75 is disposed near the correction device 74. In the present embodiment, the edge sensor 75 is disposed on a side closer to the recovery roll 76 than the driven roller 741 including the correction device 74 in a conveyance direction of the web 70. The edge sensor 75 is configured to detect the position of the end of the web 70 which is conveyed. The type of edge sensor 75 may not be particularly limited and may be appropriately selected in accordance with an embodiment. In the example of FIG. 12, the edge sensor 75 is an optical sensor and is configured to be able to measure the position of the end of the web 70 passing through a U-shaped object.

As described above, the web conveyance device 7 according to the present embodiment is configured to convey the web 70 while adjusting the position of the end of the web 70. However, a configuration of the web conveyance device 7 is not limited to such an example. With respect to the configuration of the web conveyance device 7, omission, replacement, and addition of components can be appropriately performed in accordance with an embodiment. For example, the number of driven rollers is not limited to three. In addition, the disposition of the correction device 74 is not limited to the example of FIG. 11, and may be appropriately selected in accordance with an embodiment. The type of correction device 74 is not limited to the example of FIG. 12, and may be appropriately selected in accordance with an embodiment. With respect to the configuration of the correction device 74, omission, replacement, and addition of components can be appropriately performed in accordance with an embodiment.

In the present modification example, the PLC 2 can control a conveyance speed of the web 70 by operating the servo motors (711, 761) of the respective rolls (71, 76). For this reason, a voltage of each of the servo motors (711, 761) may be treated as an operation amount, the conveyance speed of the web 70 may be treated as a control amount. That is, the prediction control development device 1 may generate a prediction model for predicting the conveyance speed of the web 70 by acquiring the first time-series data indicating change in the conveyance speed of the web 70 through the above-described processing procedure and analyzing the acquired first time-series data. The conveyance speed of the web 70 may be appropriately measured by a speed sensor (not shown) or the like. The PLC 2 may perform prediction control of the conveyance speed of the web 70 by correcting an instruction value for each of the servo motors (711, 761) using the generated prediction model. The prediction control development device 1 may acquire second time-series data indicating change in the conveyance speed of the web 70 during the prediction control and evaluate whether or not the accuracy of prediction performed using the prediction model is acceptable, based on a difference between a predicted value predicted by the prediction model and the value of the conveyance speed indicated by the second time-series data. Further, in a case where it is evaluated that the accuracy of prediction performed using the prediction model is not acceptable, the prediction control development device 1 may generate a prediction model for a conveyance speed again by analyzing the second time-series data and provide the prediction model generated again to the PLC 2.

Further, in the present modification example, the PLC 2 can control the position of the end of the web 70 by operating the actuator 743 of the correction device 74. For this reason, a voltage of the actuator 743 for adjusting the position of the end of the web 70 may be treated as an operation amount, and the position of the end of the web 70 may be treated as a control amount. That is, the prediction control development device 1 may generate a prediction model for predicting the position of the end of the web 70 by acquiring the first time-series data indicating change in the position of the end of the web 70 through the above-described processing procedure and analyzing the acquired first time-series data. The position of the end of the web 70 may be measured by the edge sensor 75. The PLC 2 may perform prediction control of the position of the end of the web 70 by correcting an instruction value for the actuator 743 using the generated prediction model. The prediction control development device 1 may acquire second time-series data indicating change in the position of the end of the web 70 during the prediction control and evaluate whether or not the accuracy of prediction performed using the prediction model is acceptable, based on a difference between a predicted value predicted by the prediction model and the value of the position of an end indicated by the second time-series data. Further, in a case where it is evaluated that the accuracy of prediction performed using the prediction model is not acceptable, the prediction control development device 1 may generate a prediction model for the position of an end again by analyzing the second time-series data and provide the prediction model generated again to the PLC 2. According to the present modification example, it is possible to optimize a factory process including the web conveyance device 7 and reduce a possibility that a poor quality product will be manufactured.

<4.2>

In the above-described embodiment, the prediction control development device 1 outputs information on the evaluation of the prediction model 50 to the display device 15 in step S207 However, an output destination of information is not limited to such an example, and may be appropriately selected in accordance with an embodiment. For example, the control part 11 may output the information on the evaluation of the prediction model 50 to a display device different from the display device 15, or may output the information to an output destination other than a display device (for example, an output device other than a memory and a display device).

<4.3>

In the above-described embodiment, the prediction model 50 and the corrector 55 are configured separately. However, configurations of the prediction model 50 and the corrector 55 are not limited to such an example. The prediction model 50 may include the corrector 55. That is, the prediction model 50 may be configured to output a corrected target value 63 in accordance with a predicted value of a control amount which is predicted, with respect to inputs of a measured value and a basic target value of a control amount. In this case, the prediction control development device 1 further uses the corrected target value 63 corresponding to the measured value of the control amount for the generation of the prediction model 50. The corrected target value 63 corresponding to the measured value of the control amount may be appropriately given. Further, in the above-described embodiment, any information processing may be executed on at least one of an input value and an output value of the prediction model 50. For example, a measured value of a control amount may be converted into a feature amount, and the prediction model 50 may be configured to receive an input of a feature amount calculated from a measured value. Meanwhile, the type of feature amount may not be particularly limited as long as any feature of the measured value can be represented, and may be appropriately selected in accordance with an embodiment. For example, the feature amount may be obtained by extracting a feature of an object to be used for prediction from time-series data of measured values. In addition, for example, the feature amount may be aggregated information (for example, time-series average values for each unit section), series of past position sections from a point in time of prediction, or the like. As a specific example, the feature amount may be, for example, a minimum value, a maximum value, an average value, a kurtosis, a differential value, or the like.

Further, in the above-described embodiment, an instruction value to be given to a control target device in prediction control is indirectly corrected by correcting a basic target value of a control amount predicted by the prediction model 50, in accordance with a predicted value of the control amount. However, a method of correcting an instruction value is not limited to such an example. The instruction value may be directly corrected in accordance with a predicted value of a control amount predicted by the prediction model 50. For example, the control part 21 of the PLC 2 may determine an instruction value in accordance with a basic target value of a control amount by a known method such as PID control or PI control in the above-described prediction control. Next, the control part 21 may execute the process of step S104 to calculate a predicted value from a measured value of an acquired control amount using the prediction model 50. In addition, the control part 21 may correct a determined instruction value in accordance with the calculated predicted value of the control amount, instead of performing the above-described step S105. A correction amount of the instruction value may be appropriately determined. For example, the correction amount of the instruction value may be calculated by the same method as the above-described Expression 1.

Meanwhile, the prediction model 50 may be configured such that a plurality of values such as values at a plurality of times in the past and a plurality of types of feature amounts are input. Basically, the accuracy of prediction performed using the prediction model 50 improves as the number of values to be input to the prediction model 50 increases. On the other hand, when the number of values to be input to the prediction model 50 increases, the amount of calculation of prediction processing of the prediction model 50 increases, and thus an execution time of the prediction processing is increased. It is preferable that the prediction model 50 be generated so that the accuracy of prediction is increased and an execution time of prediction processing is reduced. In particular, in a case where the prediction model 50 is used in a relatively small-scale control device such as a PLC, there is a possibility that prediction control will not be able to be performed due to an execution time of prediction processing. Consequently, the prediction control development device 1 according to the above-described embodiment may evaluate whether or not the prediction model 50 can use prediction control based on the accuracy of prediction performed using the prediction model 50 and an execution time of prediction processing before the prediction model 50 is provided.

Figure 13:
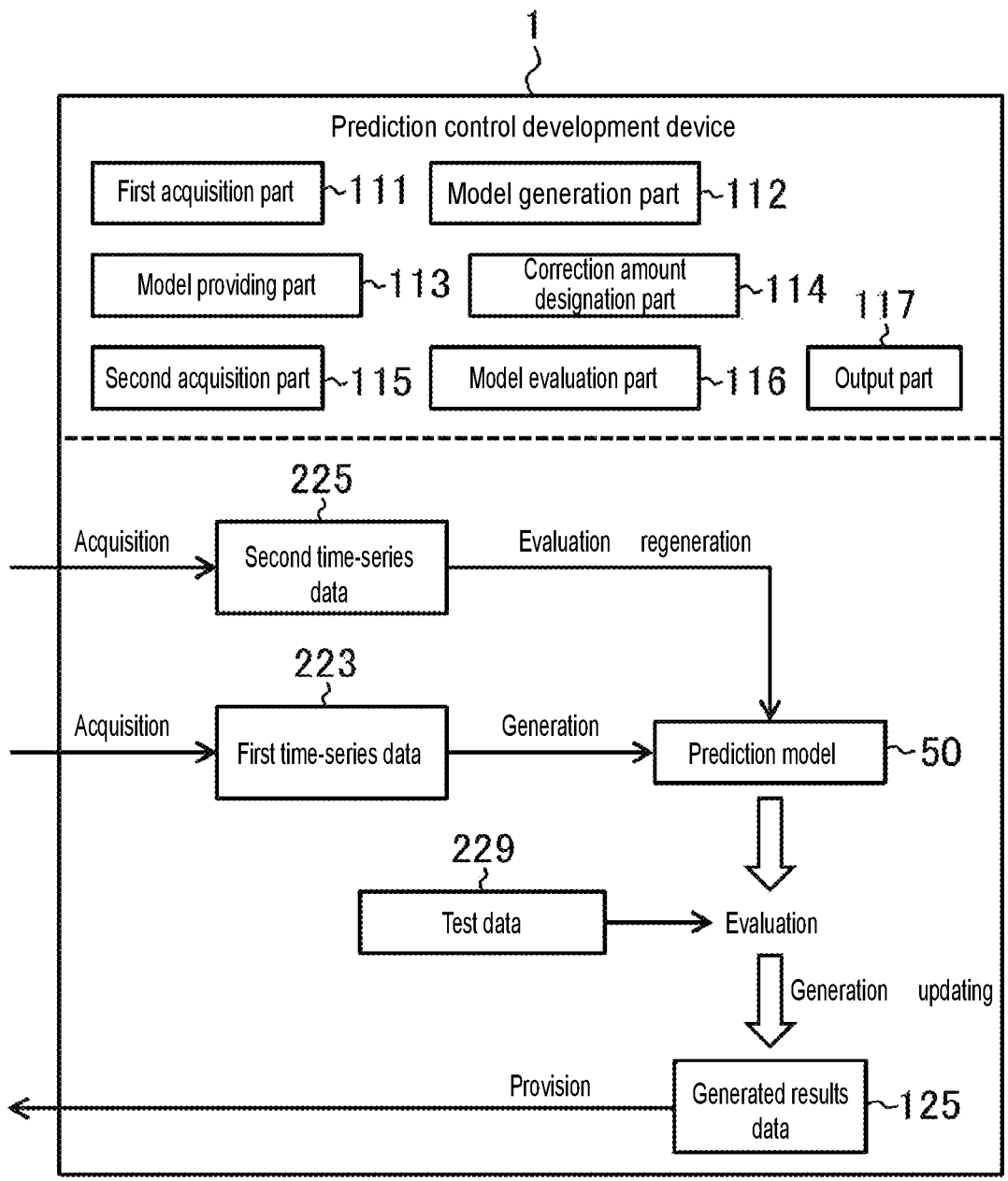
FIG. 13 schematically illustrates an example of a software configuration of a prediction control development device according to a modification example.

FIG. 13 schematically illustrates an example of a software configuration of the prediction control development device 1 according to the present modification example. In the modification example, the model evaluation part 116 evaluates the accuracy of prediction of the generated prediction model 50 and an execution time of prediction processing using test data 229. In addition, the model evaluation part 116 determines whether or not the generated prediction model 50 is used for prediction control based on a result of the evaluation of the accuracy of prediction and the execution time of the prediction processing. In a case where it is determined that the generated prediction model 50 is used for prediction control, the model providing part 113 provides the generated prediction model 50 to the controller. On the other hand, in a case where it is determined that the generated prediction model 50 is not used for prediction control, the model generation part 112 changes a parameter of the prediction model 50 to generate prediction model 50 again. The parameter corresponds to at least any one of an input value and an output value (predicted value) of the prediction model 50. The change of the parameter may include a reduction in input items, an increase in input items, the change of the type of feature amount, and the like. Except for these points, the present modification example may be the same as the above-described embodiment.

Figure 14A:
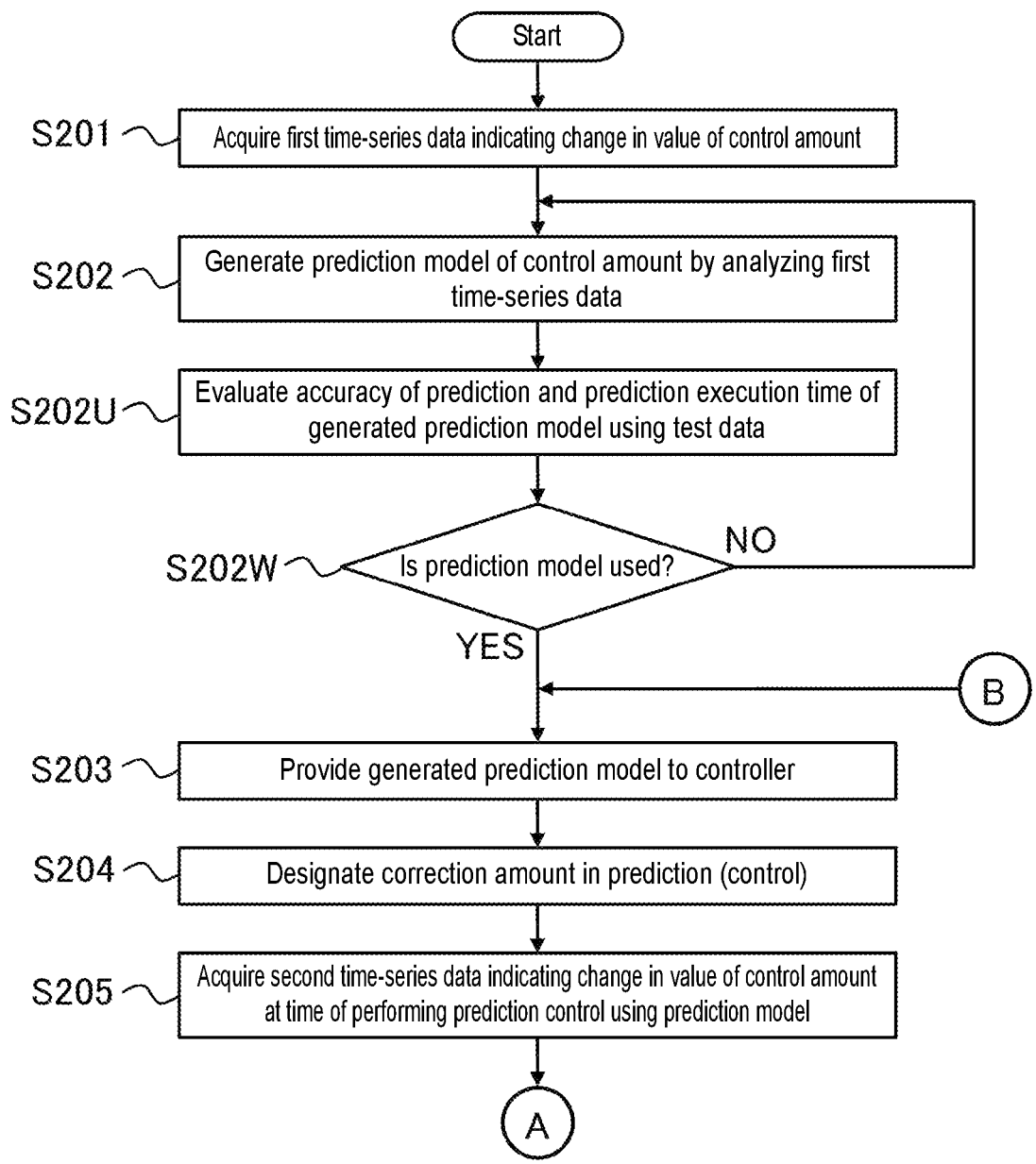
FIG. 14A illustrates an example of a processing procedure of the prediction control development device according to the modification example.
Figure 14B:
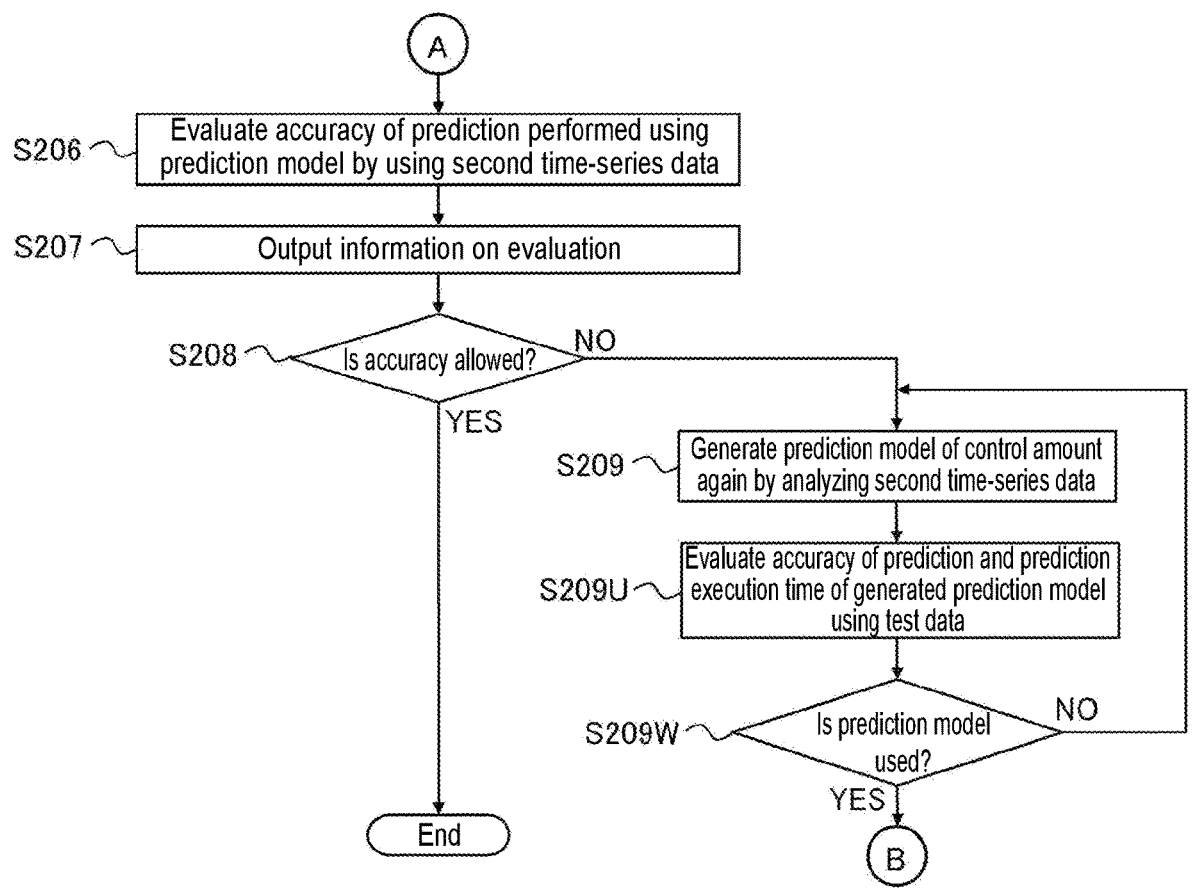
FIG. 14B illustrates an example of a processing procedure of the prediction control development device according to the modification example.

FIGS. 14A and 14B are flowcharts illustrating an example of a processing procedure of the prediction control development device 1 according to the present modification example. In the present modification example, the control part 11 operates as the model evaluation part 116 and executes the processes of steps S202U and S202W after the above-described processes of steps S201 and S202 are executed.

In step S202U, the control part 11 evaluates the accuracy of prediction of the generated prediction model 50 and an execution time of prediction processing using the test data 229. The test data 229 indicates a change in the value of a control amount of the control target device, similar to the first time-series data 223 and the second time-series data 225. In step S202U, the test data 229 may be acquired similar to the first time-series data 223. For example, the test data 229 may be acquired from a portion that has not been used for the generation of the prediction model 50 in the first time-series data 223.

A method of evaluating the accuracy of prediction performed using the prediction model 50 using the test data 229 may be substantially the same as the above-described step S206. For example, the control part 11 may simulate the operation of prediction control using the generated prediction model 50, that is, the above-described processes of steps S101 to S106. The value of a control amount indicated by the test data 229 may be used as a measured value of a control amount. The control part 11 may calculate the accuracy of prediction performed using the prediction model 50 based on the degree of a difference between a series of predicted values to be obtained from this and the value of a control amount indicated by the test data 229.

In addition, a method of evaluating an execution time of prediction processing may not be particularly limited and may be appropriately determined in accordance with an embodiment. A known method of calculating a calculation time of a program may be adopted as a method of calculating an execution time of prediction processing. For example, the control part 11 may calculate an execution time of prediction processing by simulating operation processing of prediction control using the prediction model 50 based on information indicating the performance of an operation resource of the controller (the PLC 2). The operation resource is, for example, a memory, a processor, or the like. The processing of prediction control is, for example, the above-described processes of steps S101 to S106.

In addition, for example, an estimation model for estimating an execution time of prediction processing on the controller from the parameter of the prediction model 50 may be generated in advance. The estimation model may be appropriately generated from a correlation between the parameter of the prediction model 50 and an actually measured value of an execution time when the controller uses the prediction model 50. The control part 11 may estimate an execution time of prediction processing from the generated parameter of the prediction model 50 using the estimation model.

In step S202W, the control part 11 determines whether or not the generated prediction model 50 is used for prediction control, based on a result obtained by evaluating each of the accuracy of prediction and the execution time of the prediction processing. For example, the control part 11 may output the accuracy of prediction and the execution time of the prediction processing of the prediction model 50 which are calculated in step S202U to the display device 15 and receive selection regarding whether or not the generated prediction model 50 is used for prediction control. In addition, the control part 11 may determine whether or not the generated prediction model 50 is used for prediction control, based on the selection performed by an operator.

In addition, for example, the control part 11 may determine whether or not the generated prediction model 50 is used for prediction control, based on comparison between each of the accuracy of prediction of the prediction model 50 and the execution time of the prediction processing which are calculated in step S202U and a threshold value. A first threshold value for the accuracy of prediction and a second threshold value for the execution time of the prediction processing may be appropriately determined. The threshold values may be manually set by an operator or the like, or may be appropriately determined from the past actual results using the controller. In a case where the value of the calculated accuracy of prediction is larger than the first threshold value and an estimated value of the calculated execution time of the prediction processing is smaller than the second threshold value, the control part 11 may determine that the generated prediction model 50 is used for prediction control. Otherwise, the control part 11 may determine that the generated prediction model 50 is not used for prediction control.

In a case where it is determined that the generated prediction model 50 is used for prediction control, the control part 11 executes the process of step S203 and the subsequent processes, similar to the above-described embodiment. On the other hand, in a case where it is determined that the generated prediction model 50 is not used for prediction control, the control part 11 returns to step S202 to repeat a process of generating a prediction model 50. At this time, the control part 11 changes a parameter of the prediction model 50.

The change of a parameter may be manually performed by an operator or the like. For example, the control part 11 may output the parameter of the prediction model 50 to the display device 15 and receive the designation of the change of the parameter. In addition, the control part 11 may change the parameter of the prediction model 50 in accordance with the received content.

In addition, for example, the control part 11 may automatically change the parameter of the prediction model 50 based on a result obtained by evaluating the accuracy of prediction and the execution time of the prediction processing. As an example, in a case where the execution time of the prediction processing is greater than a threshold value, any one of a reduction in input items and the change of a feature amount having a shorter execution time than a target feature amount may be selected. Further, for example, in a case where the accuracy of prediction is less than the threshold value, any one of an increase in input items and the change of a feature amount may be selected.

After the parameter of the prediction model 50 is changed, the control part 11 executes the process of step S202 again and generates a prediction model 50 having the changed parameter from the first time-series data 223. In addition, the control part 11 executes the processes of steps S202U and S202W on the generated prediction model 50.

In the present modification example, the control part 11 operates as the model evaluation part 116 after the above-described processes of steps S203 to S209 are executed, ad executes the processes of steps S209U and S209W. Except that an evaluation target is changed from the prediction model 50 generated in step S202 to the prediction model 50 generated in step S209, steps S209U and S209W may be the same as the above-described steps S202U and S202W. In a case where it is determined in step S209W that the generated prediction model 50 is not used for prediction control, the control part 11 returns to step S209 to repeat a process of generating a prediction model 50. At this time, similar to the above-described step S202, the control part 11 may generate a prediction model 50 from the second time-series data 225 after changing a parameter of the prediction model 50. Meanwhile, in step S209U, the test data 229 may be acquired from a portion that has not been used for the generation of the prediction model 50 in the first time-series data 223 and the second time-series data 225.

<4.4>

In the above-described embodiment, the correction amount designation part 114 may be omitted from the software configuration of the prediction control development device 1, and step S204 may be omitted from the processing procedure of the prediction control development device 1. In this case, the value of a correction amount for an instruction value may be given in advance. In addition, step S204 may be executed at any timing until the prediction model 50 is used. When the processes of steps S203 to S207 are repeated, the control part 11 may appropriately determine the value of a correction amount for an instruction value in step S204. In addition, the output processing performed in step S207 may be omitted from the processing procedure of the prediction control development device 1. In response to this, the output part 117 may be omitted from the software configuration of the prediction control development device 1.

The invention claimed is:

1. A prediction control development device comprising:
a first acquisition part configured to acquire first time-series data indicating change in a value of a control amount of a control target device while a controller is controlling the control target device by giving a plurality of instruction values to the control target device as time-series data of an operation amount;
a model generation part configured to generate a prediction model of the control amount by analyzing the acquired first time-series data;
a model providing part configured to provide the prediction model to the controller to control the control target device by causing the controller to correct the instruction values in accordance with a predicted value of the control amount predicted by the prediction model and giving the corrected instruction values to the control target device;
a correction amount designation part configured to designate an amount of correction for each of the instruction values to the controller, wherein the value of the correction amount is the difference between the predicted value and a target value of the control amount that is multiplied with a proportional constant plus a constant term;
a second acquisition part configured to acquire second time-series data indicating change in a value of a control amount of the control target device while the controller is controlling the control target device by giving the corrected instruction values to the control target device; and
a model evaluation part configured to evaluate whether or not accuracy of prediction performed using the prediction model is acceptable based on a difference between a predicted value of the control amount predicted by the prediction model and a value of the control amount indicated by the second time-series data,
wherein in a case where it is evaluated that the accuracy of prediction performed using the prediction model is not acceptable,
until the accuracy of prediction performed using the prediction model is evaluated as acceptable by the model evaluation part,
the model generation part is configured to generate a prediction model of the control amount again by analyzing the acquired second time-series data, and
the model providing part is configured to update a prediction model held in the controller by providing the prediction model generated again to the controller,
wherein the correction amount designation part is configured to increase the value of the correction amount whenever the prediction model is updated.

2. The prediction control development device according to claim 1, further comprising:
an output part which displays the predicted value of the control amount predicted by the prediction model and the value of the control amount indicated by the second time-series data on a display device.

3. The prediction control development device according to claim 2, wherein
the control target device is a pressing machine constituted by a mold,
the operation amount is a voltage of a servo motor driving the mold, and
the control amount is a position of the mold.

4. The prediction control development device according to claim 2, wherein
the control target device is a web conveyance device configured to convey a web,
the operation amount is a voltage of an actuator for adjusting a position of an end of the web, and
the control amount is the position of the end of the web.

5. A prediction control development method comprising:
causing a computer to execute
a step of acquiring first time-series data indicating change in a value of a control amount of a control target device while a controller is controlling the control target device by giving a plurality of instruction values to the control target device as time-series data of an operation amount,
a step of generating a prediction model of the control amount by analyzing the acquired first time-series data,
a step of providing the prediction model to the controller to control the control target device by causing the controller to correct the instruction values in accordance with a predicted value of the control amount predicted by the prediction model and giving the corrected instruction values to the control target device, a step of designating an amount of correction for each of the instruction values to the controller, wherein the value of the correction amount is the difference between the predicted value and a target value of the control amount that is multiplied with a proportional constant plus a constant term, a step of acquiring second time-series data indicating change in a value of a control amount of the control target device while the controller is controlling the control target device by giving the corrected instruction values to the control target device, and a step of evaluating whether or not accuracy of prediction performed using the prediction model is acceptable based on a difference between a predicted value of the control amount predicted by the prediction model and a value of the control amount indicated by the second time-series data, wherein in a case where it is evaluated that the accuracy of prediction performed using the prediction model is not acceptable, until the accuracy of prediction performed using the prediction model is evaluated as acceptable in the step of evaluating, the computer is configured to generate a prediction model of the control amount again by analyzing the acquired second time-series data and to update a prediction model held in the controller by providing the prediction model generated again to the controller, wherein the computer is configured to increase the value of the correction amount whenever the prediction model is updated.

6. A non-transitory computer readable storage medium storing a prediction control development program causing a computer to execute:

a step of acquiring first time-series data indicating change in a value of a control amount of a control target device while a controller is controlling the control target device by giving a plurality of instruction values to the control target device as time-series data of an operation amount, a step of generating a prediction model of the control amount by analyzing the acquired first time-series data, a step of providing the prediction model to the controller to control the control target device by causing the controller to correct the instruction values in accordance with a predicted value of the control amount predicted by the prediction model and giving the corrected instruction values to the control target device, a step of designating an amount of correction for each of the instruction values to the controller, wherein the value of the correction amount is the difference between the predicted value and a target value of the control amount that is multiplied with a proportional constant plus a constant term, a step of acquiring second time-series data indicating change in a value of a control amount of the control target device while the controller is controlling the control target device by giving the corrected instruction values to the control target device, and a step of evaluating whether or not accuracy of prediction performed using the prediction model is acceptable based on a difference between a predicted value of the control amount predicted by the prediction model and a value of the control amount indicated by the second time-series data, and wherein in a case where it is evaluated that the accuracy of prediction performed using the prediction model is not acceptable, until the accuracy of prediction performed using the prediction model is evaluated as acceptable in the step of evaluating, the computer is configured to generate a prediction model of the control amount again by analyzing the acquired second time-series data and to update a prediction model held in the controller by providing the prediction model generated again to the controller, wherein the computer is configured to increase the value of the correction amount whenever the prediction model is updated.

* * * * *